US012768722B2

(12) United States Patent
Ballew et al.

(10) Patent No.: US 12,768,722 B2
(45) Date of Patent: Oct. 20, 2026

(54) VOLUMETRIC METAOPTICS FOR MULTI-DIMENSIONAL WAVEFRONT SENSING

(71) Applicant: California Institute of Technology, Pasadena, CA (US)

(72) Inventors: Conner K Ballew, Pasadena, CA (US); Gregory D Roberts, Alhambra, CA (US); Andrei Faraon, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 43 days.

(21) Appl. No.: 18/799,930

(22) Filed: Aug. 9, 2024

(65) Prior Publication Data

US 2026/0063474 A1 Mar. 5, 2026

Related U.S. Application Data

(60) Provisional application No. 63/533,242, filed on Aug. 17, 2023.

(51) Int. Cl.
*G01J 9/02* (2006.01)

(52) U.S. Cl.
CPC ......... *G01J 9/02* (2013.01); *G01J 2009/0261* (2013.01)

(58) Field of Classification Search
CPC ........ G01J 9/02; G01J 2009/0261; G01J 3/18; G02B 1/002; G02B 5/0278; G02B 5/3083;
(Continued)

(56) References Cited

U.S. PATENT DOCUMENTS

| | | | |
|---|---|---|---|
| 3,971,065 | A | 7/1976 | Bayer |
| 5,385,114 | A | 1/1995 | Milstein et al. |

(Continued)

FOREIGN PATENT DOCUMENTS

| | | | |
|---|---|---|---|
| CN | 1635662 | A | 7/2005 |
| CN | 101044631 | A | 9/2007 |

(Continued)

OTHER PUBLICATIONS

Adelson E. H. et al., "Single Lens Stereo with a Plenoptic Camera" *IEEE Transactions on Pattern Analysis and Machine Intelligence*, vol. 14 No. 2, Feb. 1992, pp. 99-106.

(Continued)

*Primary Examiner* — Mohamed K Amara
(74) *Attorney, Agent, or Firm* — Steinfl + Bruno LLP

(57) ABSTRACT

Methods and devices enabling simultaneous sorting light based on its wavelength, polarization, and direction of propagation are disclosed. The disclosed device maps different combinations of input light properties to different corresponding pixels on an underlying image sensor array, allowing for compressed sensing of multiple light properties simultaneously. The described devices can be designed using advanced inverse design and topology optimization techniques, including adjoint-based optimization and level-set methods. Exemplary performance results show smooth, predictable behavior for input states between the explicitly optimized states, allowing it to interpolate and classify a continuum of input light properties.

19 Claims, 9 Drawing Sheets

(58) Field of Classification Search
CPC .... G02B 5/3025; G02B 5/0268; G02B 5/021; G02B 5/0215; G02B 1/005
See application file for complete search history.

(56) References Cited

U.S. PATENT DOCUMENTS

| | | | | |
|---|---|---|---|---|
| 5,438,414 | A | 8/1995 | Rust | |
| 6,991,334 | B2 | 1/2006 | Okuyama et al. | |
| 7,408,712 | B2 | 8/2008 | Ruoff et al. | |
| 7,864,114 | B2 | 1/2011 | Sanada | |
| 7,903,530 | B2 | 3/2011 | Kim | |
| 7,911,386 | B1 | 3/2011 | Itoh et al. | |
| 8,002,998 | B2 | 8/2011 | Iwata et al. | |
| 9,159,761 | B2 | 10/2015 | Kokubun | |
| 9,170,358 | B2 | 10/2015 | Chen | |
| 9,207,357 | B2 | 12/2015 | Steinhardt et al. | |
| 9,254,089 | B2 | 2/2016 | Tearney et al. | |
| 9,739,918 | B2 | 8/2017 | Arbabi et al. | |
| 10,698,134 | B2 * | 6/2020 | Anopchenko | G02F 1/015 |
| 11,057,116 | B1 | 7/2021 | Buck, Jr. | |
| 11,239,276 | B2 | 2/2022 | Roberts et al. | |
| 11,397,331 | B2 | 7/2022 | Camayd-Munoz et al. | |
| 11,525,959 | B2 * | 12/2022 | Lee | G02B 6/262 |
| 11,604,364 | B2 * | 3/2023 | Rubin | G02B 1/002 |
| 11,650,428 | B2 * | 5/2023 | Wang | G02C 7/06 359/630 |
| 11,841,520 | B2 * | 12/2023 | Ellenbogen | G02B 5/288 |
| 11,874,476 | B1 * | 1/2024 | Kress | G02B 27/30 |
| 12,135,433 | B2 * | 11/2024 | Rubin | G02B 27/286 |
| 12,198,300 | B2 * | 1/2025 | Yang | G06N 3/094 |
| 12,216,290 | B2 | 2/2025 | Camayd-Munoz et al. | |
| 12,237,094 | B2 * | 2/2025 | Zheng | G02B 21/367 |
| 12,320,988 | B2 | 6/2025 | Roberts et al. | |
| 12,339,430 | B2 * | 6/2025 | Liang | G02B 27/46 |
| 12,416,752 | B2 * | 9/2025 | Rubin | G02B 5/1809 |
| 2002/0057431 | A1 | 5/2002 | Fateley et al. | |
| 2003/0028114 | A1 | 2/2003 | Casscells, III et al. | |
| 2003/0082105 | A1 | 5/2003 | Fischman et al. | |
| 2003/0118799 | A1 | 6/2003 | Miller et al. | |
| 2003/0210396 | A1 | 11/2003 | Hobbs et al. | |
| 2004/0184006 | A1 | 9/2004 | Okuyama et al. | |
| 2005/0234220 | A1 | 10/2005 | Koga et al. | |
| 2005/0237134 | A1 | 10/2005 | Furuya et al. | |
| 2006/0057707 | A1 | 3/2006 | Cunningham et al. | |
| 2006/0113622 | A1 | 6/2006 | Adkisson et al. | |
| 2007/0019306 | A1 | 1/2007 | Wu et al. | |
| 2007/0229955 | A1 | 10/2007 | Kawamura et al. | |
| 2007/0233396 | A1 | 10/2007 | Tearney et al. | |
| 2008/0013960 | A1 | 1/2008 | Tearney et al. | |
| 2008/0047928 | A1 | 2/2008 | Iwata et al. | |
| 2008/0157140 | A1 | 7/2008 | Cho | |
| 2008/0161194 | A1 | 7/2008 | Turner et al. | |
| 2009/0052019 | A1 | 2/2009 | Brueck et al. | |
| 2009/0250110 | A1 | 10/2009 | Yu et al. | |
| 2009/0276188 | A1 * | 11/2009 | Cui | G01J 9/02 356/450 |
| 2010/0033818 | A1 | 2/2010 | Petcavich et al. | |
| 2010/0107693 | A1 | 5/2010 | Rajala et al. | |
| 2010/0148283 | A1 | 6/2010 | Shih | |
| 2010/0149617 | A1 | 6/2010 | Kroll et al. | |
| 2010/0264295 | A1 | 10/2010 | Van Dijk et al. | |
| 2010/0302481 | A1 | 12/2010 | Baum et al. | |
| 2010/0309457 | A1 * | 12/2010 | Cui | G01J 9/0215 356/121 |
| 2011/0069377 | A1 | 3/2011 | Wu et al. | |
| 2011/0237892 | A1 | 9/2011 | Tearney et al. | |
| 2011/0285942 | A1 | 11/2011 | Guo et al. | |
| 2011/0287218 | A1 * | 11/2011 | Narimanov | G02B 5/003 451/28 |
| 2012/0013989 | A1 | 1/2012 | Choi et al. | |
| 2012/0082863 | A1 | 4/2012 | Ohta et al. | |
| 2012/0092770 | A1 | 4/2012 | Li et al. | |
| 2012/0194912 | A1 | 8/2012 | Faraon et al. | |
| 2012/0268809 | A1 * | 10/2012 | Guo | G02B 5/201 359/359 |
| 2013/0099343 | A1 | 4/2013 | Toshikiyo et al. | |
| 2013/0141190 | A1 | 6/2013 | Kitaoka et al. | |
| 2013/0208360 | A1 | 8/2013 | Coggio et al. | |
| 2014/0078514 | A1 | 3/2014 | Zhu | |
| 2014/0092373 | A1 | 4/2014 | Tabirian et al. | |
| 2014/0146390 | A1 | 5/2014 | Kaempfe et al. | |
| 2014/0226190 | A1 | 8/2014 | Bridges et al. | |
| 2014/0270374 | A1 | 9/2014 | Unzueta | |
| 2014/0293467 | A1 | 10/2014 | Palikaras et al. | |
| 2014/0339606 | A1 | 11/2014 | Lin et al. | |
| 2014/0340732 | A1 | 11/2014 | Zhang et al. | |
| 2015/0198812 | A1 | 7/2015 | Gaylord et al. | |
| 2016/0025914 | A1 | 1/2016 | Brongersma et al. | |
| 2016/0043794 | A1 | 2/2016 | Ashrafi et al. | |
| 2016/0054172 | A1 | 2/2016 | Roh et al. | |
| 2016/0077261 | A1 | 3/2016 | Arbabi et al. | |
| 2016/0109381 | A1 | 4/2016 | Pavani | |
| 2016/0206184 | A1 | 7/2016 | Tearney et al. | |
| 2017/0069678 | A1 | 3/2017 | Cheng et al. | |
| 2017/0146856 | A1 | 5/2017 | Yokota | |
| 2017/0201324 | A1 | 7/2017 | Wang | |
| 2017/0372866 | A1 | 12/2017 | McMorran | |
| 2017/0373700 | A1 | 12/2017 | Lu et al. | |
| 2018/0045953 | A1 | 2/2018 | Fan et al. | |
| 2018/0348511 | A1 * | 12/2018 | Arbabi | G02B 5/0294 |
| 2019/0064532 | A1 * | 2/2019 | Riley, Jr. | G02B 27/0916 |
| 2019/0173191 | A1 | 6/2019 | Kamali et al. | |
| 2019/0178714 | A1 * | 6/2019 | Faraji-Dana | G02B 5/1847 |
| 2019/0191144 | A1 | 6/2019 | Arbabi et al. | |
| 2019/0215069 | A1 | 7/2019 | Romanato et al. | |
| 2020/0124866 | A1 | 4/2020 | Camayd-Munoz et al. | |
| 2020/0348500 | A1 * | 11/2020 | Kwon | G01J 9/02 |
| 2020/0356890 | A1 | 11/2020 | Ashrafi | |
| 2021/0118938 | A1 | 4/2021 | Roberts et al. | |
| 2021/0286188 | A1 | 9/2021 | Rubin et al. | |
| 2022/0214219 | A1 | 7/2022 | Faraon et al. | |
| 2022/0299760 | A1 * | 9/2022 | Fan | G02B 27/0012 |
| 2023/0122182 | A1 | 4/2023 | Camayd-Munoz et al. | |
| 2023/0207592 | A1 | 6/2023 | Watanabe et al. | |
| 2024/0031052 | A1 | 1/2024 | Roberts et al. | |
| 2024/0272426 | A1 * | 8/2024 | Yang | G02B 5/001 |
| 2024/0369738 | A1 * | 11/2024 | Wang | G03F 9/7065 |
| 2024/0426660 | A1 * | 12/2024 | Chattopadhyay | B82Y 40/00 |
| 2025/0164669 | A1 * | 5/2025 | Arbabi | G02B 27/0955 |
| 2025/0199472 | A1 * | 6/2025 | Lei | G02B 1/002 |

FOREIGN PATENT DOCUMENTS

| | | | |
|---|---|---|---|
| CN | 101720447 | A | 6/2010 |
| CN | 101868713 | A | 10/2010 |
| CN | 102870018 | A | 1/2013 |
| CN | 102981205 | A | 3/2013 |
| CN | 103048723 | A | 4/2013 |
| CN | 103154777 | A | 6/2013 |
| CN | 103364955 | A | 10/2013 |
| CN | 103399369 | A | 11/2013 |
| CN | 204481029 | U | 7/2015 |
| CN | 107076884 | A | 8/2017 |
| CN | 107664780 | A | 2/2018 |
| CN | 109545812 | A | 3/2019 |
| CN | 107076884 | B | 3/2020 |
| CN | 111684581 | A | 9/2020 |
| CN | 113167938 | A | 7/2021 |
| CN | 114556166 | A | 5/2022 |
| CN | 116344564 | A | 6/2023 |
| EP | 3195048 | A1 | 7/2017 |
| EP | 3871020 | A2 | 9/2021 |
| JP | 2004219998 | A | 8/2004 |
| JP | 2004233910 | A | 8/2004 |
| JP | 2005084290 | A | 3/2005 |
| JP | 2006049902 | A | 2/2006 |
| JP | 2006245926 | A | 9/2006 |
| JP | 2008052108 | A | 3/2008 |
| JP | 2008185799 | A | 8/2008 |
| JP | 2009510391 | A | 3/2009 |
| JP | 2009223074 | A | 10/2009 |
| JP | 2011527930 | A | 11/2011 |
| JP | 2011530403 | A | 12/2011 |
| JP | 2012015424 | A | 1/2012 |

(56) References Cited

FOREIGN PATENT DOCUMENTS

| | | | |
|---|---|---|---|
| JP | 2012027172 | A | 2/2012 |
| JP | 2012058437 | A | 3/2012 |
| JP | 2012058673 | A | 3/2012 |
| JP | 2012078541 | A | 4/2012 |
| JP | 2012510637 | A | 5/2012 |
| JP | 2012530945 | A | 12/2012 |
| JP | 2013505479 | A | 2/2013 |
| JP | 2013109349 | A | 6/2013 |
| JP | 2014534459 | A | 12/2014 |
| JP | 2015087431 | A | 5/2015 |
| JP | 2015194637 | A | 11/2015 |
| JP | 2017527857 | A | 9/2017 |
| JP | 2017538974 | A | 12/2017 |
| JP | 2021012376 | A | 2/2021 |
| JP | 2021521481 | A | 8/2021 |
| JP | 2022503657 | A | 1/2022 |
| JP | 7069265 | B2 | 5/2022 |
| JP | 2022110029 | A | 7/2022 |
| KR | 20080061029 | A | 7/2008 |
| KR | 20210064240 | A | 6/2021 |
| KR | 20220083736 | A | 6/2022 |
| TW | 201140141 | A | 11/2011 |
| WO | 2004/059784 | A1 | 7/2004 |
| WO | 2007/008440 | A2 | 1/2007 |
| WO | 2008/113978 | A1 | 9/2008 |
| WO | 2010/017503 | A1 | 2/2010 |
| WO | 2012/008551 | A1 | 1/2012 |
| WO | 2016/044104 | A1 | 3/2016 |
| WO | 2016/086204 | A1 | 6/2016 |
| WO | 2019/108945 | A1 | 6/2019 |
| WO | 2019/113106 | A1 | 6/2019 |
| WO | 2019/203926 | A1 | 10/2019 |
| WO | 2020/146029 | A2 | 7/2020 |
| WO | 2021/076154 | A1 | 4/2021 |
| WO | 2024/019876 | A1 | 1/2024 |

OTHER PUBLICATIONS

Afifi S., et al., "Electromagnetic Scattering From 3D Layered Structures With Randomly Rough Interfaces: Analysis With the Small Perturbation Method and the Small Slope Approximatio,". IEEE Transactions on Antennas and Propagation [online], Jul. 2014 [Retrieved on Jul. 20, 2020]. 9 Pages. Retrieved from https://ieeexplore.ieee.org/abstract/document/6862023.

Aieta, F. et al., "Aberration-free ultrathin flat lenses and axicons attelecom wavelengths based on plasmonic metasurfaces," *Nano Lett.* 12,4932-4936. Aug. 15, 2012. 5 Pages.

Aieta, F et al., "Multiwavelength achromatic metasurfaces by dispersivephase compensation," *Science* 347, 1342-1345. Mar. 20, 2015. 4Pages.

Allen, L. et al. "Orbital angular momentum of light and the transformation of Laguerre-Gaussian laser modes." Physical Review A, vol. 45, No. 11, 8185, Jun. 1992. Allowance for Chinese Application No. 201580049474.8 filed on Mar. 14, 2017 on behalf of California Institute of Technology. Mail Date: Dec. 31, 2019. Chinese + English Trans. 3 Pages.

Allowance for Chinese Application No. 201580049474.8 filed on Mar. 14, 2017 on behalf of California Institute of Technology. Mail Date: Dec. 31, 2019. Chinese + English Trans. 3 Pages.

Andreou, A. G., et al., "Polarization Imaging: Principles and IntegratedPolarimeters," *IEEE Sensors Journal,* vol. 2, No. 6, Dec. 2002.pp. 566-576. 11 Pages.

Antipa, N., et al., "Video from Stills: Lensless Imaging with Rolling Shutter," arXiv: 1905. 13221v1 [eess.IV] May 30, 2019, 8 pages.

Appeal Decision of Refusal issued for JP Patent Application No. 2017-513414 filed on Sep. 11, 2015, on behalf of California Institute of Technology. Issue Date: Jul. 13, 2021. Japanese Original and ENG Transl. 42 Pages.

Arbabi, A., et al., "Conference Presentation: Increasing Efficiency of high-NA Metasurface Lenses," Proc. of SPIE vol. 10113. Apr. 28, 2017. Abstract Only. 1 Page. Watch Online at https://www.spiedigitallibrary.org/conference-proceedings-of-spie/10113/101130K/Increasing-efficiency-of-high-NA-metasurface-lenses-Conference-Presentation/10.1117/12.2250391.short.

Arbabi, A. et al., "Controlling the phase front of optical fiber beams using high contrast Metastructures," *OSA Technical Digest,* STu3M.4 Optical Society of America, Jan. 2014. 2 Pages.

Arbabi, A., et al., "Dielectric metasurfaces for complete control of phase and polarization with subwavelength spatial resolution and high transmission," Nature Nanotechnology, published online on Aug. 31, 2015. 8 Pages.

Arbabi, A. et al., "Fundamental limits of ultrathin metasurfaces," Preprintat http://arXiv.org/abs/141 1.2537.Nov. 10, 2014. 6 Pages.

Arbabi, A. et al., "Fundamental limits of ultrathin metasurfaces" *Scientific Reports* 7, 43722 (Mar. 2017). 9 pages.

Arbabi, A., et al., "Miniature optical planar camera based on awide-angle metasurface doublet corrected for monochromatic aberrations," *NatureCommunications,* 7:13682. Published Nov. 28, 2016. 9 Pages.

Arbabi, A., et al., "Planar Metasurface Retroreflector," *NaturePhotonics,* Advance Online Publication. Published Online Jun. 19, 2017. 7 Pages.

Arbabi, A., et al., "Subwavelength-thick lenses with high numerical apertures and large efficiency based on high-contrast transmitarrays," Nature Communications. 6:7069. May 7, 2015. 9 Pages.

Arbabi, E., et al., "Controlling the sign of chromatic dispersion in diffractiveoptics with dielectric metasurfaces," *Optica,* V. 4, N. 6. Jun. 2017. 8 Pages.

Arbabi, E., et al., "Full-Stokes Imaging Polarimetry Using DielectricMetasurfaces," ACS Photonics 2018, 5, 3132-3140. Mar. 21, 2018. 9 Pages.

Arbabi, E., et al., "MEMS-tunable dielectric metasurface lens," NatureCommunications, 9:812. Feb. 23, 2018. 9 Pages.

Arbabi, E., et al., "Multiwavelength metasurfaces through spatial multiplexing," *Scientific Reports,* 6:32803. Sep. 6, 2016. 8 Pages.

Arbabi, E., et al., "Multiwavelength polarization-insensitive lenses basedon dielectric metasurfaces with meta-molecules," Optica, vol. 3, No. 6. Jun. 10, 2016. pp. 628-633. 6 Pages.

Arbabi et al., "Dielectric metasurfaces for complete control of phase and polarization with subwavelength spatial resolution and high transmission," + Supplementary Information. Nature Nanotechnology doi: 10.1038/nnano.2015.186/. Nov. 2015. 17 Pages.

Astilean, S., et al., "High-efficiency subwavelength diffractive element patterned in a high-refractive-index material for 633 nm," *Optics Letters,* vol. 23, No. 7, Apr. 1, 1998. pp. 552-554. 3 Pages.

Avayu, O., et al., "Composite functional metasurfaces for multispectral achromatic optics," *Nature Communications* 8, 14992 (Published Apr. 5, 2017). 8 Pages.

Ballew, C., et al., "Constraining Continuous Topology Optimizations to Discrete Solutions for Photonic Applications," ACS Photonics 2023, 836-844. 9 pages.

Ballew, C., et al., "Mechanically reconfigurable multi-functional meta-optics studies at microwave frequencies," Scientific Reports (2021) 11:11145. 9 pages. DOI:10.1038/s41598-021-88785-5.

Balthasar Mueller, J. P., et al., "Ultracompact metasurface in-linepolarimeter," *Optica,* vol. 3, No. 1. Jan. 2016. pp. 42-47.6 Pages.

Bozinovic, N. et al. "Terabit-scale orbital angular momentum mode division multiplexing in fibers." Science, Jun. 28, 2013, vol. 340, No. 6140, pp. 1545-1548. 4 pages.

Cai, X., et al., "Dynamically controlling terahertz wavefronts with cascaded metasurfaces," Advanced Photonics, 2021, vol. 3(3). 036003. 10 pages.

Camayd-Muñoz, P., et al., "Multifunctional volumetric meta-optics for color and polarization image sensors," *Optica,* 7(4), pp. 280-283. Apr. 2020. 4 Pages.

Camayd-Muñoz, P., et al., Supplementary material for "Multifunctional volumetric meta-optics for color and polarization image sensors," Published in Optica, V. 7 No. 4, Mar. 31, 2020. 5 Pages.

Charanya, T., et al., "Trimodal color-fluorescence-polarization endoscopy aided by a tumor selective molecular probe accurately detects flat lesions in colitis-associated cancer," J. Biomed. Opt. 19(12) 126002, Dec. 2014, 15 pages.

(56) References Cited

OTHER PUBLICATIONS

Chen, H. T.; Taylor, A. J.; Yu, N. "A review of metasurfaces: Physics and applications." Reports on Progress in Physics 2016, 79. (41 pages).
Chen, W. T., et al., "Integrated Plasmonic Metasurfaces for Spectropolarimetry," Nanotechnology 27, 224002. Apr. 26, 2016. 8 Pages.
Chihhui, Wu., et al., "Spectrally selective chiral silicon metasurfaces based on infrared Fano resonances", Nature Communications, vol. 5, May 27, 2014, XP055465835, DOI: 10.1038/ncomms4892. 9 Pages.
Coffeen, D.L., et al., "Polarization and scattering characteristics in the atmospheres of Earth, Venus, and Jupiter," J. Opt. Soc. Am., vol. 69, No. 8, Aug. 1979. pp. 1051-1064. 14 Pages.
Communication under Rule 71(3) issued for EPPatent application 15842895.3 filed on Mar. 8, 2017, on behalf of California Institute of Technology. Mail Date: May 25, 2021. 5 Pages.
Corrected Notice of Allowance for U.S. Appl. No. 16/657,640, filed Oct. 18, 2019, on behalf of California Institute of Technology. Mail Date: Dec. 9, 2021. 11 Pages.
Decision of Refusal for JP Patent Application No. 2017-513414 filed on Sep. 11, 2015, on behalf of California Institute of Technology. Dispatch Date: May 12, 2020. Japanese + English Trans. 19 Pages.
Decision to Grant for EP Patent application 15842895.3 filed on Mar. 8, 2017, on behalf of California Institute of Technology. Mail Date: Oct. 7, 2021. 1 Page.
Decker, M., et al., "High-efficiency dielectric Huygens' surfaces," Adv. Opt. Mater. 3, 813-820. Feb. 1, 2015. 8 Pages.
Deguzman, P. C., et al., "Stacked subwavelength gratings as circular polarization filters," *Applied Optics,* vol. 40, No. 31. Nov. 1, 2001. pp. 5731-5737. 7 Pages.
Ding, F., et al. "Beam-Size-Invariant Spectropolarimeters UsingGap-Plasmon Metasurfaces," ACS Photonics, 943-49. Published Feb. 28, 2017. 7 pages.
Dorrah, A. H., et al., "Tunable structured light with flat optics," Science 379, eabi6860 (2022). 12 pages.
Dottermusch, S., et al., "Exposure-dependent refractive index of Nanoscribe IP-Dip photoresist layers," *Optics letters,* 44, V. 1, Jan. 1, 2019. pp. 29-32. 4 Pages.
Egan, W. G., "Terrestrial polarization imagery obtained from the SpaceShuttle: characterization and interpretation," *Applied Optics,* vol. 30,No. 4. Feb. 1, 1991. pp. 435-441. 8 pages.
Ellenbogen, T., et al., "Chromatic Plasmonic Polarizers for Active VisibleColor Filtering and Polarimetry," *ACS Publications,* Nano Lett. 2012, 12. Jan. 9, 2012,1026-1031. 6 Pages.
European Examination Report for European Application No. 19909195.0 filed on May 20, 2021 on behalf of California Institute of Technology. Mail Date: Jun. 5, 2023. 4 Pages.
Evlyukhin, A. B., et al., "Multipole light scattering by nonsphericalnanoparticles in the discrete dipole approximation," Phys. Rev. B 84,235429. Dec. 20, 2011. 8 pages.
Extended European Search Report issued for EP Application No. 19909195.0 filed on May 20, 2021, on behalf of California Institute of Technology. Mail Date: May 30, 2022. 10 Pages.
Fatemi, R., et al., "Subtractive photonics," Optics Express vol. 29, No. 2, 877-893, Jan. 2021. 17 pages.
Fattal, D., et al., "Flat dielectric grating reflectors with focusing-abilities," Nature Phonics, vol. 4. Jul. 2010. pp. 466-470. 5Pages.
Final Office Action for U.S. Appl. No. 16/656,156, filed Oct. 17, 2019, on behalf of California Institute of Technology. Mail Date: Dec. 1, 2021. 20 Pages.
Final Office Action issued for U.S. Appl. No. 16/777,491, filed Jan. 30, 2022, on behalf of California Institute of Technology. Mail date: Aug. 17, 2022. 18 Pages.
Final Office Action issued for U.S. Appl. No. 17/853,540, filed Jun. 29, 2022 on behalf of California Institute of Technology. Mail Date: Mar. 21, 2024. 16 pages.
First Chinese Office Action for Chinese Application No. 201580049474.8 filed on Mar. 14, 2017 on behalf of California Institute of Technology. Mail Date: Dec. 19, 2018. 16 Pages. English + Chinese.
First Office Action + Search Report issued for Chinese Application No. 201980067786.X filed on Apr. 14, 2021, on behalf of California Institute of Technology. Issue Date: Aug. 3, 2022. Chinese Original + English Translation. 22 Pages.
First Office Action issued for Chinese Patent Application No. 201980101356.5 filed on Oct. 18, 2019 on behalf of California Institute of Technology. Issue Date: Aug. 22, 2023. 10 pages. (English translation only).
Flanders, D.C., "Submicrometer periodicity gratings as artificial anisotropic dielectrics," *Applied Physics Letters,* 42: p. 492-4. Mar. 15, 1983. 4 Pages.
García-Etxarri, A. et al., "Strong magnetic response of submicronsilicon particles in the Infrared," Opt. Express 19, 4815-4826. Feb. 28, 2011. 12 Pages.
Garcia, M., et al., "Bio-inspired color-polarization imager forreal-time in situ imaging," *Optica,* vol. 4, No. 10. Oct. 2017.pp. 1263-1271. 9 Pages.
Garcia, N. M., "Surface Normal reconstruction using circularly polarized light," *Optics Express,* vol. 23, No. 11. Jun. 1, 2015. pp. 14391-14406. 16 Pages.
Gissibl, T., et al., "Refractive index measurements of photo-resists for three-dimensional direct laser writing," *Optical Materials Express,* 7(7), 2293-2298. Jul. 1, 2017. 6 Pages.
Groever, B., et al., "Meta-lens doublet in the visible region," NanoLett. 17, 4902-4907, Jun. 29, 2017. 6 Pages.
Gruev, V., et al., "CCD polarization imaging sensor with aluminum nanowire optical filters," *Optics Express,* vol. 18, No. 18. Aug. 2010. pp. 19087-19094. 8 Pages.
Gruev, V., et al., "Fabrication of a dual-tier thin film micropolarizationarray," *Optics Express,* vol. 15, No. 8. Apr. 16, 2007. pp. 4994-5007. 14 Pages.
Gruev, V., et al., "Image Sensor With Focal Plane Extraction of Polarimetric Information" *IEEE, ISCAS.* Jan. 2006. pp. 213-216. 4 Pages.
Guo, J., et al., "Fabrication of thin-film micropolarizer arrays for visibleimaging polarimetry," *Applied Optics,* vol. 39, No. 10. Apr. 1, 2000.pp. 1486-1492. 7 Pages.
Hong, J., et al., "Absorptive metasurface color filters based on hyperbolic metamaterials for a CMOS image censor," Optics Express vol. 29, No. 3. 3643-3658, Feb. 2021. 16 pages.
Hong, L., et al., "Integrated Angle-Insensitive Nanoplasmonic Filters for Ultraminiaturized Fluorescence Microarray in a 65 nm Digital CMOS Process," ACS Photonics, 5, Sep. 12, 2018. pp. 4312-4322. 11 Pages.
Hsiao, H-H., et al., "Fundamentals and Applications of Metasurfaces," *Small Methods,* Mar. 24, 2017. 20 Pages.
Huang, Y-W, et al., "Versatile total angular momentum generation using cascaded J-plates," Optics Express 7649, vol. 27, No. 5, Mar. 2018. 16 pages.
International Search Report and Written Opinion for International Application No. PCT/US2019/057026 filed on Oct. 18, 2019 on behalf of California Institute of Technology Mail Date: Aug. 10, 2020 12 pages.
International Search Report and Written Opinion for International Application No. PCT/US2023/026804, filed on Jun. 30, 2023, on behalf of California Institute of Technology, Mailed on Oct. 18, 2023, 11 Pages.
International Search Report and Written Opinion for PCT App. No. PCT/US2019/056809 filed on Oct. 17, 2019 on behalf of California Institute of Technology. Mail Date: Jul. 31, 2020. 13 Pages.
International Search Report and Written Opinion for PCT/US2015/049837filed Sep. 11, 2015 on behalf of California Institute of Technology. Mail Date: Jan. 11, 2016. 13 pages.
Jensen J. S. et al., "Topology optimization for nano-photonics" *Laster & Photonics Reviews,* rev. 5 No. 2,2011, pp. 308-321.
Jensen J. S. et al., "Systematic design of photonic crystal structures using topology optimization: Low-loss waveguide bends" *Applied Physics Letters,* Mar. 22, 2004, vol. 84 No. 12, pp. 2022-2024.

(56) References Cited

OTHER PUBLICATIONS

Kamali et al., "A review of dielectric optical metasurfaces for wavefront control" Nanophotonics 2018; 7(6): 1041-1068. 28 pages.
Khorasaninejad, M., et al., "Efficient Polarization Beam Splitter PixelsBased on a Dielectric Metasurface," *Optica*, vol. 2, No. 4. Apr. 15, 2015. 7 Pages.
Khorasaninejad, M., et al., "Metalenses at visible wavelengths: Diffraction-limited focusing and subwavelength resolution imaging," Science, vol. 352 Issue 6290, Jun. 3, 2016. pp. 1190-1194. 6 Pages.
Kikuta, H. et al., "Achromatic quarter-wave plates using the dispersion of form Birefringence," Appl. Opt. 36, 1566-1572. Mar. 1, 1997. 7 Pages.
Kildishev, A. V. et al., "Planar photonics with metasurfaces," *Science*339, 1232009, Mar. 15, 2015. 8 Pages.
Klemm, A. B. et al., "Experimental high numerical aperture focusing withhigh contrast gratings," *Opt. Lett.* 38, 3410-3413. Aug. 28, 2013.4 Pages.
Komar, A., et al., "Electrically tunable all-dielectric opticalmetasurfaces based on liquid crystals," Appl. Phys. Lett. 110, 071109; doi: 10.1063/1.4976504. Feb. 15, 2017. 5 Pages.
Kozawa, Y. et al., "Generation of a radially polarized laser beam by useof a conical Brewster prism," *Opt. Lett.* 30, 3063. Nov. 15, 2005.3 Pages.
Kuznetsov, A. I., et al., "Optically resonant dielectric nanostructures," Science, V. 354 Issue 6314. Nov. 18, 2016. 10 Pages.
Lalanne, P., "Blazed binary subwavelength gratings with efficiencies larger than those of conventional échelette gratings," *Optics Letters*, vol. 23, No. 14. Jul. 15, 1998. 1081-1083. 3 Pages.
Lalanne, P. et al., "Design and fabrication of blazed binary diffractive elements with 20 sampling periods smaller than the structural cutoff," *J. Opt. Soc. Am.* A 16, 1143-1156. May 1999. 14 Pages.
Lalau-Keraly, C M., et al., "Adjoint shape optimization applied to electromagnetic design," Optics Express 21693, vol. 21, No. 18, Sep. 2013. 9 pages. DOI:10.134/EO.21.021693.
Lebbe N. et al., "Robust shape and topology optimization of nanophotonic devices using the level set method" *Journal of Computational Physics*, vol. 395,Jun. 27, 2019, pp. 710-746.
Levoy M. et al., "Light Field Microscopy" *Association for Computing Machinery,*2006, pp. 924-934.
Li, Y., et al., "UV to NIR optical properties of IP-Dip, IP-L, and IP-S after two-photon polymerization determined by spectroscopic ellipsometry," Optical Materials Express, vol. 9, No. 11, Nov. 1, 2019. pp. 4318-4328 (11 pages).
Lin, D., et al., "Dielectric gradient metasurface optical elements," Science, U.S.A., vo. 345, p. 298-302. Jul. 18, 2014. 6 Pages.
Lin, D., et al., "Photonic Multitasking Interleaved Si NanoantennaPhased Array," *Nano Lett.*, 16. Nov. 18, 2016. pp. 7671-7676. 6Pages.
Lin, J et al., "Nanostructured holograms for broadband manipulation ofvector beams," *Nano Lett.* 13, 4269-4274. Aug. 5, 2013. 6 Pages.
Lin, Z., et al., "End-to-end nanophotonic inverse design for imaging and polarimetry," Nanophotonics 2021; 10(3): 1177-1187. 11 pages.
Liu, V., et al., "S4: a free electromagnetic solver for layered periodic structures," Comput. Phys. Commun. 183, 2233-2244. Available online May 19, 2012. 12 Pages.
Liu, Y., et al., "Complementary fluorescence-polarization microscopy using division-of-focal-plane polarization imaging sensor," Journal of Biomedical Optics, 17 (11). Nov. 2012. 116001-1-116001-4. 5Pages.
Lu, F., et al., "Planar high-numerical-aperture low-loss focusingreflectors and lenses using subwavelength high contrast gratings," OpticsExpress, vol. 18, No. 12. Jun. 7, 2010. pp. 12606-12614. 9 Pages.
Mait J. N et al., "Computation imaging" *Advanced in Optics and Photonics*, vol. 10 No. 2,Jun. 2018, pp. 409-483.
Mansouree, M., et al., "Multifunctional 2.5D metastructures enabled by adjoint optimization," Optica, Jan. 2020, vol. 7, No. 1. 77-84, 8 pages.
Miller D.A.B., "Fundamental limit for optical components," J. Opt Soc. Am. V, vol. 24, No. 10, Oct. 2007, A1-A18. 18 pages.
Miller, D.A.B., "Why optics needs thickness," Science 379, 41-45 (2023). 5 pages.
Monticone, F., et al., "Full control of nanoscale optical transmissionwith a composite Metascreen," *Phys. Rev. Lett.* 110, 203903. May 17, 2013.5 Pages.
Mutlu, M., et al., "Experimental realization of a high-contrast gratingbased broadband quarter- wave plate," *Optics express*, 20: p. 27966-73. Nov. 30, 2012. 8 Pages.
Nersisyan, S. R. "Characterization of optically imprinted polarization gratings," *Appl. Opt.* 48, 4062-4067 (2009).
Nishiwaki, S., et al., "Efficient colour splitters for high-pixel-density image sensors", *Nature Photonics*, vol. 7, No. 3, Feb. 3, 2013. pp. 248-254. 7 Pages. XP055358688, London ISSN: 1749-4885, DOI: 10.1038/nphoton.2012.345.
Non-Final Office Action for U.S. Appl. No. 14/852,450, filed Sep. 11, 2015 on behalf of California Institute of Technology. Mail Date: Dec. 12, 2016. 11 Pages.
Non-Final Office Action for U.S. Appl. No. 16/656,156, filed Oct. 17, 2019, on behalf of California Institute of Technology. Mail Date: Jul. 27, 2021. 13 pages.
Non-Final Office Action issued for U.S. Appl. No. 17/475,167, filed Sep. 14, 2021 on behalf of California Institute of Technology. Mail Date: Sep. 26, 2024. 43 pages.
Non-Final Office Action issued for U.S. Appl. No. 17/853,540, filed Jun. 29, 2022 on behalf of California Institute of Technology. Mail Date: Nov. 16, 2023. 30 pages.
Nordin, G. P., et al., "Diffractive Optical Elements for Strokes VectorMeasurement with a Focal Plane Array," *Proceedings of SPIE*, vol. 3754.Part of the Conference on Polarization. Jul. 1999. 10 Pages.
Nordin, G. P., et al., "Micropolarizer array for infrared imaging polarimetry," *J. Opt. Soc. Am. A.*, vol. 16, No. 5. May 1999. pp. 1168-1174. 7 Pages.
Notice of Allowability for U.S. Appl. No. 16/656,156, filed Oct. 17, 2019, on behalf of California Institute of Technology. Mail Date: Jun. 8, 2022. 3 Pages.
Notice of Allowance for U.S. Appl. No. 16/656,156, filed Oct. 17, 2019, on behalf of California Institute of Technology. Mail Date: Apr. 7, 2022. 11 Pages.
Notice of Allowance for U.S. Appl. No. 16/657,640, filed Oct. 18, 2019, on behalf of California Institute of Technology. Mail Date: Sep. 29, 2021. 9 Pages.
Notice of Allowance for U.S. Appl. No. 14/852,450, filed Sep. 11, 2015 on behalf of California Institute of Technology. Mail Date: Apr. 25, 2017. 11 Pages.
Notice of Reasons for Refusal issued for Japanese Patent Applicaiton No. 2022-515969 filed on Oct. 18, 2019 on behalf of California Institute of Technology. Dispatch Date: Aug. 8, 2023. 15 pages.
Notice of Reasons for Refusal issued for Japanese Patent Application No. 2021-512844 filed on Mar. 8, 2021 on behalf of California Institute of Technology. Dispatch Date: Sep. 5, 2023. 13 pages. (English translation only).
Notice to File a Response issued for KR Application No. 10-2021-7009690 filed on Apr. 1, 2021, on behalf of California Institute of Technology. Dispatch Date: Jul. 26, 2023. 5 Pages.
Notification for Reason of Refusal for JP Patent application JP 2017-513414 filed on Sep. 11, 2015 on behalf of California Institute of Technology. Drafting Date: Aug. 15, 2019. Japanese + English Trans. 17 Pages.
Notification of Reasons for Refusal issued for Japanese Patent Application No. 022-076165 filed on May 30, 2022, on behalf of California Institute of Technology. Dispatch Date: Jul. 5, 2022. JP Original and English Translation. 7 Pages.
Notification of Reasons for Refusal Issued for Japanese Patent Application No. 2020-153339 filed on Sep. 11, 2020, on behalf of California Institute of Technology. Mail Date: Nov. 30, 2021. Japanese Original + English Translation. 5 Pages.
Notification of Reasons for Refusal issued for JP Application No. 2022-076165 filed on May 30, 2022, on behalf of California Institute of Technology. Dispatched on Feb. 21, 2023. JP Original and English Translation. 7 Pages.

(56) References Cited

OTHER PUBLICATIONS

Paniagua-Dominguez, R., et al., "A Metalens With Near-Unity Numerical Aperture," *Nano Letters,* Published online on Feb. 27, 2018. 32 Pages.

Pegard, N.C., et al., "Compressive light-field microscopy for 3D neural activity recording," Optica, vol. 3, No. 5, May 2016. 517-524. 8 pages.

Pezzaniti, J. L., et al., "Mueller matrix imaging polarimetry," *OpticalEngineering,* vol. 34 No. 6. Jun. 1995. pp. 1558-1568. 11 Pages.

Pfeiffer, C et al., "Cascaded metasurfaces for complete phase andpolarization control," *Appl. Phys. Lett.* 102, 231116. Published online Jun. 11, 2013. 5 pages.

Phelan, C. F. et al., "Generation of a radially polarized light beamusing internal conical diffraction," *Opt. Express* 19, 21793-21802, Oct. 20, 2011. 10 Pages.

Piggot, A.Y., et al., "Inverse design and demonstration of a compact and broadband on-chip wavelength demimultiplexer" Nat. Photonics 9, Jun. 2015. pp. 374-377. 5 Pages.

Q. Chen et al., "Nanophotonic Image Sensors" Small 12, 4922-4935 (2016). 14 pages.

Rejection Decision issued for CN Application No. 201980067786.X filed on Apr. 14, 2021 on behalf of California Institute of Technology. Mail Date: Jan. 2, 2024. Chinese + English translation. 9 pages.

Ren, H., Li, X. et al. (2016). "On-chip noninterference angular momentum multiplexing of broadband light." Science, vol. 352, No. 6287, May 13, 2016, pp. 805-809. 6 pages.

Restriction Requirement for U.S. Appl. No. 16/656,156, filed Oct. 17, 2019 on behalf of California Institute of Technology Mail Date: Mar. 2, 2021 6 pages.

Restriction Requirement issued for U.S. Appl. No. 17/853,540, filed Jun. 29, 2022 on behalf of California Institute of Technology. Mail Date: Sep. 22, 2023. 6 Pages.

Roberts, G. et al. "3D-patterned inverse-designed mid-infrared metaoptics." Nature Communications, vol. 14, No. 2768, 2023, 12 pages.

Roberts, N. W., et al., "Animal Polarization Imaging and Implications for optical Processing," Proceedings of the IEEE, vol. 102 No. 10. Oct. 2014. pp. 1427-1434. 8 Pages.

Roques-Carmes C. et al., "Toward 3D-Printed Inverse-Designed Metaoptics" *ACS Photonics,* vol. 9,Jan. 7, 2022, pp. 43-51.

Rubin, N A., et al., "Imaging Polarimetry through metasurface polarization gratings," Optics Express vol. 30, No. 6, Mar. 2022, 9389-9412. 24 pages.

Rubin, N. A., et al., "Matrix Fourier optics enables a compact full-Stokes polarization camera," *Science,* 365(6448), eaax1839. Jul. 5, 2019. 10 Pages.

Schonbrun, E. et al., "Reconfigurable imaging systems using elliptical nanowires," Nano Lett. 11, 4299-4303. Sep. 16, 2011. 5 Pages.

Search Report issued for Japanese Patent Application No. 2020-153339 filed on Sep. 11, 2020, on behalf of California Institute of Technology. Date Available: Oct. 27, 2021. Japanese Original + English Translation. 24 Pages.

Second Chinese Office Action for Chinese Application No. 201580049474.8 filedon Mar. 14, 2017 on behalf of California Institute of Technology. MailDate: Aug. 2, 2019. Chinese + English Trans. 11 Pages.

Second Chinese Office Action for Chinese Application No. 201980067786.X filed on Apr. 14, 2021 on behalf of California Institute of Technology. Mail Date: Feb. 27, 2023. 8 Pages. English + Chinese.

Second Notice of Reasons for Refusal issued for Japanese Patent Applicaiton No. 2022-515969 filed on Oct. 18, 2019 on behalf of California Institute of Technology. Dispatch Date: Jan. 9, 2024. 6 pages. (English translation + Japanese Original).

Second Notice of Reasons for Refusal issued for Japanese Patent Application No. 2021-512844 filed on Mar. 8, 2021 on behalf of California Institute of Technology. Dispatch Date: Jan. 30, 2024. 14 pages. (English translation + Japanese Original).

Second Notification of Reasons for Refusal issued for JP Application No. 2022-076165 filed on May 30, 2022, on behalf of California Institute of Technology. Dispatched on Oct. 18, 2022. JP Original and English Translation.

Sell, D., et al., "Large-Angle, Multifunctional Metagratings Based on Freeform Multimode Geometries," Nano Letters. 17, 3752-3757. May 1, 2017. 6 Pages.

Shastri K. et al., "Nonlocal flat optics" *Nature Photonics,* vol. 17,Jan. 2023, pp. 36-47.

Solomon, J. E., et al., "Polarization imaging," *Applied Optics,* vol. 20, No. 9. May 1, 1981. pp. 1537-1544. 8 Pages.

Spinelli, P., et al., "Broadband omnidirectional antireflection coating based on subwavelength surface Mie resonators," Nature Commun. 3,692. Feb. 21, 2012. 5 Pages.

Staude, I., et al., "Metamaterial-inspired silicon nanophotonics," NaturePhotonics, vol. 11. May 2017. pp. 274-284. pp. 11 Pages.

Supplementary Search Report and Opinion for EPPatent application 15842895.3 filed on Mar. 8, 2017, on behalf of California Institute of Technology. Mail Date: May 15, 2018. 6 pages.

Suzen, M., et al., "Compressed sensing in diffuse optical tomography," Optics Express 23676-23690, Nov. 8, 2010, vol. 18, No. 23. 15 pages.

Swanson, G. J., "Binary optics technology: the theory and design ofmulti-level diffractive optical elements," Technical Report 845. MassachusettsInstitute of Technology, DTIC, Aug. 14, 1989. 53 Pages.

Third Chinese Office Action issued for CN application No. 201980067786.X filed on Apr. 14, 2021 on behalf of California Institute of Technology. Issue Date: Sep. 14, 2023. 5 pages. English translation only.

Tyo, J.S., et al., "Review of passive imaging polarimetry for remote sensing applications," Applied Optics, vol. 45, No. 22. Aug. 1, 2006.pp. 5453-5469. 17 Pages.

Vercruysee, D., et al., "Analytical level set fabrication constraints for inverse design," Scientific Reports (2019) 9:98999. 7 pages. DOI:10.1038/s41598-019-45026-0.

Vo, S., et al., "Sub-Wavelength Grating Lenses with a Twist," *IEEE Photonics Technology Letters,* vol. 26, No. 13. Jul. 1, 2014. 4 Pages.

Walraven, R., "Polarization imagery," *Optical Engineering,* vol. 20 No. 1. Jan.-Feb. 1981. 5 Pages.

Wang A. et al., "Light field image sensors based on the Talbot effect" *Applied Optics,* vol. 48 No. 31, Nov. 2009, pp. 5897-5905.

Wang, J. et al. "Terabit free-space data transmission employing orbital angular momentum multiplexing". Nature photonics, vol. 6, No. 7, Jul. 2012, pp. 488-496. 9 pages.

Warren, M.E., et al., "High-efficiency subwavelength diffractive opticalelement in GaAsfor 975 nm," Optics Letters, Jun. 15, 1995. 20: p. 1441-3. 3 Pages.

Wen, D., et al., "Metasurface for characterization of the polarization state of light," *Optics Express,* vol. 23, No. 8., pp. 10273-10281. Apr. 13, 2015. 10 Pages.

West, P.R. et al., "All-dielectric subwavelength metasurface focusinglens," *Opt. Express* 22, 26212. Oct. 20, 2014. 10 Pages.

Willner, A. E. et al. "Orbital angular momentum of light for communications." Applied Physics Reviews, vol. 8, No. 041312, Oct. 27, 2021. 69 pages.

Yang, Y. et al., "Dielectric meta-reflectarray for broadband linear polarization conversion and Optical vortex Generation," Nano Lett. 14, 1394-1399. Feb. 18, 2014. 6 Pages.

Yu, N., et al., "A broadband, background-free quarter-wave plate basedon plasmonic Metasurfaces," *Nano letters,* 12: p. 6328-33. Nov. 6, 2012,6 Pages.

Yu, N. et al., "Flat optics with designer metasurfaces," Nature Mater. 13, 139-150. Published online Jan. 23, 2014. 12 Pages.

Yu, N. et al., "Light propagation with phase discontinuities: generalizedlaws of reflection and refraction," *Science* 334, 333-337. Oct. 21, 2011.6 Pages.

Zhan., A., et al., "Metasurface Freeform Nanophotonics," Scientific Reports, 7:1673. Published online on May 10, 2017. 9 Pages.

Zhan, Q., "Cylindrical vector beams: from mathematical concepts toapplications," Adv. Opt. Photon. 1, 1-57. Jan. 29, 2009. 57 Pages.

(56) References Cited

OTHER PUBLICATIONS

Zhao, N., et al., "Perfect RGB-IR Color Routers for Sub-wavelength Size CMOS Image Sensor Pixels," Adv. Photonics Res. 2021, 2. 10 pages. DOI:10.1002/adpr.202000048.
Zhao, Y et al., "Twisted optical metamaterials for planarized ultrathinbroadband circular polarizers," *Nature Commun.* 3, 870. May 29, 2012.7 Pages.
Zhou Y. et al., "Multilayer Noninteracting Dielectric Metasurfaces for Multiwavelength Metaoptics" *American Chemical Society,* vol. 18,Nov. 5, 2018, pp. 7529-7537.
Lightman S. "Exploring for New Insights in the Performance of a 3D Orbital Angular Momentum Mode-Sorter" *Frontiers in Physics,* vol. 10, Mar. 2022, pp. 1-7.
Milione G. et al., "Orbital-Angular-Momentum Mode (De)Multiplexer: A Single Optical Element for MIMO-based and non-MIMO-based Multimode Fiber Systems" *Optical Fiber Communication Conference,* Mar. 2014, 3 pages.
Non-Final Office Action for U.S. Appl. No. 18/346,061, filed Jun. 30, 2023 on behalf of California Institute of Technology Mail Date: Jan. 22, 2026 15 pages.
Non-Final Office Action for U.S. Appl. No. 18/799,930, filed Aug. 9, 2024 on behalf of California Institute of Technology Mail Date: Jan. 23, 2026 34 pages.

* cited by examiner

VOLUMETRIC METAOPTICS FOR MULTI-DIMENSIONAL WAVEFRONT SENSING

CROSS REFERENCE TO RELATED APPLICATIONS

The present application claims priority to U.S. Provisional Patent Application No. 63/533,242 filed on Aug. 17, 2023, incorporated herein by reference in its entirety.

STATEMENT OF GOVERNMENT GRANT

"This invention was made with government support under Grant No. HR0011-17-2-0035 awarded by DARPA and under Grant No. 80NM00018D0004 awarded by NASA (JPL). The government has certain rights in the invention."

FIELD

The present disclosure is related to manipulation of light, more in particular, volumetric metaoptics for muti-dimensional wavefront sensing.

BACKGROUND

A significant component in the field of optics is concerned with the manipulation of light through the utilization of diverse object geometries and material compositions. Lenses, gratings, and waveplates are a few key examples. Each of these controls a different fundamental property of light. Lenses transform light based on its direction of propagation, grating and waveplates do the same based on wavelength, and on polarization, respectively.

These basic tools, along with a collection of others invented through the years, allow us to create optical systems that control practically all properties of light at will. However, the integration of these constituent elements in a modular configuration, with the objective of achieving improved operational efficiency and expanded capabilities, results in the development of larger and more complex systems.

A well-known tradeoff in optical engineering design is the balance between an optical system's performance and its number of constituent components. Some notable achievements of modern engineering involve integrating a huge number of components into small volumes. Modern smartphone cameras, tabletop microscopes and spectrometers, and space telescopes are good examples of balancing performance with size. Despite the prevalent practice, no fundamental physical principle dictates that sophisticated optical functionalities must necessarily be realized through the combination of numerous basic components. This perceived necessity is, in fact, an artificial constraint, primarily arising from the limited diversity of basic optical constituents that are commercially available.

If optical components receive their properties by virtue of their shape, then the collection of basic optical components in use today is paltry to the infinite possibilities of shapes that we can imagine, and to the massive number of possible shapes than can be fabricated with current nanotechnology. Rather than designing based on a combination of discrete components to achieve complex optical functions, design efforts may be directed towards identifying singular, bespoke configurations capable of directly fulfilling multi-faceted objectives. The core challenge, therefore, lies in determining and realizing these optimal geometric forms.

The ideal imaging system would efficiently capture information about the fundamental properties light: propagation direction, wavelength, and polarization. Most common imaging systems only map the spatial degrees of freedom of light onto a two-dimensional image sensor, with some wavelength and/or polarization discrimination added at the expense of efficiency. One of the most challenging problems in optics is how to group and classify multiple degrees of freedom and map them on a two-dimensional sensor space.

The identification of an ideal shape to perform the complex task of simultaneous manipulation of various fundamental properties of light has historically been a very challenging problem. With modern computational power and efficient algorithms, the field of inverse-designed metaoptics has emerged as a promising candidate for miniaturizing optical systems by incorporating multifunctionality. The primary limitation of such approach, in its current state, is that its exploration has been predominantly limited to two-dimensional (2D) integrated photonic applications. Most research in dielectric meta-optics focuses on metasurfaces that consist of a single, approximately wavelength-thick layer of subwavelength scale antennas with the ability to completely control the phase and polarization of an incident wavefront. The ability to impose independent phase profiles to two orthogonally polarized inputs allows a single metasurface to perform tasks that historically could only be achieved with cascaded systems of bulk components, which has improved applications that must obey strict size constraints while maintaining high efficiencies. However, further expanding the multifunctionality of metasurfaces to multiple angles and wavelengths tends to come at the cost of efficiency.

To recover the performance lost by increasing multifunctionality, the size of the metaoptics system can be increased. This idea has been explored in recent years by employing multiple metasurfaces in a cascaded system. While these systems have a reduced size relative to systems that employ only conventional bulk optical elements, the size of the system is primarily dictated by the distance between metasurfaces. The distance between metasurface elements must be sufficiently large to preserve the assumptions that metasurface design is reliant on. Broadly speaking, placing meta-atoms directly in contact with other meta-atoms will alter their transmission in ways that are difficult to predict using only the individual response of each meta-atom. The paradigm of cascading elements that are spatially separated enough to preserve their design independence provides an intuitive way to design complex systems, but is not strictly necessary. Instead, design methodologies that account for the effects of near-field coupling and multiple scattering events (i.e. full-wave Maxwell solvers, including FDTD) are required for more advanced operation.

Recent work has demonstrated the tractability of designing 3D volumetric metaoptics using inverse-design techniques. These techniques are aided by the adjoint method for electromagnetics, which utilizes adjoint symmetry in Maxwell's equations to efficiently compute the gradient of arbitrary figures of merit (FoMs) with respect to material permittivity. This can be subsequently used to optimize the shape of a structure in a process referred to as topology optimization. Full-wave simulations require significant computational resources to perform, so applications of inverse-designed metaoptics have been limited to integrated waveguide components or small 3D components, on the order of several wavelengths per side.

SUMMARY

The described methods and devices address the limitations, shortcomings and design challenges as stated above.

The disclosed teachings involve utilizing inverse-design algorithms to find a 3D structure, e.g. a cube, that can simultaneously sort light based on its wavelength, polarization, and direction of propagation. Thus, all fundamental properties of light are controlled at once. As an example, the disclosed devices may have dimensions such as 3 μm×3 μm×4 μm, allowing effectively condensing a complex optical system down to a size comparable to the wavelength of the light it controls. Given the small size, many of such devices can be tiled across an image sensor array to enhance the information of every pixel of an image taken by a simple camera. When more than one device is used, the implemented devices may be identical or at least one of them may have a different configuration (e.g., may be of different size, or may implement different functionalities) from the other ones.

According to the disclosed teachings, volumetric meta-optics consisting of a highly scattering, inverse-designed medium structured with subwavelength resolution can sort light simultaneously based on direction, wavelength and polarization. This is done by mapping these properties to a distinct combination of pixels on the image sensor for compressed sensing applications, including wavefront sensing, beam profiling, and next-generation plenoptic sensors.

The disclosed devices are very useful for the evolving fields of computation imaging and compressed sensing, with immediate applications in wavefront sensing and plenoptic cameras. In the near-term, such devices may operate at wavelengths longer than visible light-likely midinfrared or terahertz frequencies, given the difficulties of fabricating nanoscale 3D objects According to a first aspect of the present disclosure, a device for multi-dimensional wavefront sensing is provided, comprising: a three-dimensional (3D) structure configured to receive incident light; and a sensor array disposed underneath the 3D structure, the sensor array comprising multiple pixels; wherein the 3D structure is configured to focus different combinations of wavelength, polarization, and propagation direction of the incident light onto different corresponding pixels or combinations of pixels of the sensor array.

According to a second aspect of the present disclosure, an optical system for multi-dimensional wavefront sensing is provided, comprising an array of devices, each device comprising: a three-dimensional (3D) structure configured to receive incident light; and a sensor array disposed underneath the 3D structure, the sensor array comprising multiple pixels; wherein each 3D structure is configured to focus different combinations of wavelength, polarization, and propagation direction of the incident light onto different pixels or combinations of pixels of a corresponding portion of the sensor array.

According to a third aspect of the present disclosure, a method for designing an optical system for multi-dimensional wavefront sensing is disclosed, the optical system including a three-dimensional structure and a sensor array disposed under the 3D structure at a set distance, the method comprising: defining multiple figures of merit (FoMs) corresponding to at least three optical functionalities; performing a multi-objective optimization to determine a configuration of the 3D structure that optimizes the multiple FoMs simultaneously; and outputting the optimized configuration of the 3D structure.

Further aspects of the disclosure are provided in the description, drawings and claims of the present application.

DETAILED DESCRIPTION

Two-dimensional (2D) image sensors are the most common detectors for light. A leading optical engineering task is how to best extract the information from the incident optical field using an optical system and a planar image sensor. For example, a black and white camera maximizes the amount of spatial information by performing a one-to-one mapping between the direction of propagation and a pixel on the image sensor, but spectral and polarization information is lost. A line scan multispectral camera maps only one spatial coordinate to a direction on the image sensor while the other direction records the spectrum of the spatial pixel. Various other mappings are used in cameras to image color, polarization, light field, etc.

Since the information capacity of a 2D image sensor is finite, getting more information about some degrees of freedom for light comes at the expense of information in other degrees of freedom. Also, in general purpose systems with trivial mapping implementations that use conventional optical components like lenses, gratings, and prisms, a single pixel on the image sensor detects a specific combination of single degrees of freedom. For example, a camera may detect the combination of a specific direction, wavelength band, and polarization. Thus, if S spatial directions, W wavelength bands, and P polarizations need to be resolved, then S×W×P pixels are needed, where P is at most 4 to fully classify polarization through Stokes parameters.

In some applications, there is prior knowledge about the input light field, in which case it is possible to use mappings that more efficiently utilize the pixels of the sensor. According to embodiments of the present disclosure, an inverse designed volumetric meta-optic device can efficiently map different combinations of wavelengths, directions and polarizations into combinations of pixels on an image sensor. The compressed information can fully classify properties of the incident fields under certain approximations, namely that the wavefronts are monochromatic, locally linear in phase, and linearly polarized. The disclosed devices are based on metaoptics, which describes materials patterned with subwavelength resolution that impart customized transformations to incident light.

Figure 1A:
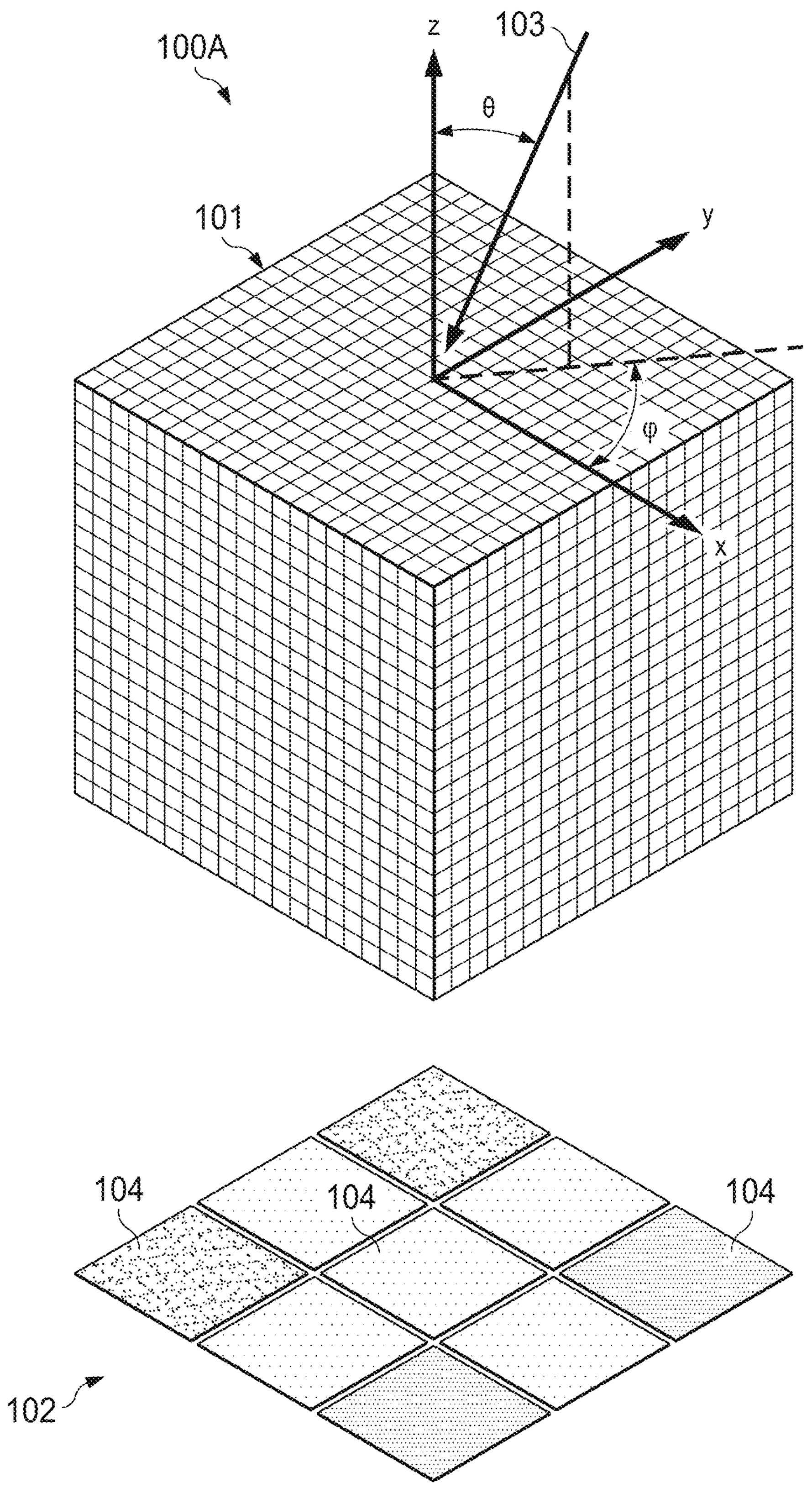
FIG. 1A shows an exemplary optical system according to an embodiment of the present disclosure.

FIG. 1A shows an exemplary optical system (100A) according to an embodiment of the present disclosure. Optical system (100A) comprises a three-dimensional (3D) structure (101) and a sensor array (102) disposed underneath the 3D structure (101). Sensor array (102) includes multiple pixels (104). As an example, the sensor array shown is a 3×3 array including 9 pixels. An incident planewave (103) is input to 3D structure (101). Subsequent to traversing and undergoing scattering within 3D structure (101), the incident light, depending upon its properties, will be focused onto different pixels (104) of the sensor array (102). In accordance with the teachings of the present disclosure, optical system (100A) can classify the incident light based on some desired fundamental properties of the light. In an embodiment, the fundamental properties may be propagation direction, wavelength, and polarization, although other optical functionalities may also be envisaged. The sensor array can be a 3×3 sensor array with a total of 9 pixels. This amount of multi-functionality at both high efficiency and compactness has not been obtained to this degree in the past. Other embodiments with a number of pixels larger or smaller than 9 may also be implemented.

According to the teachings of the present disclosure, the 3D structure (101) shown in FIG. 1A may be composed of silicon dioxide ($SiO_2$) and titanium dioxide (TiO2). In this configuration, silicon dioxide may function as the background material, providing a medium against which light scattering occurs. The design of the structure may implement materials other than $SiO_2$ and $TiO_2$. In some embodiments, the bottom of 3D structure (102) of FIG. 1A may be 1.5 μm above sensor array (102). According to the teachings of the present disclosure, to attain the desired functionalities, the 3D structure (101) is fabricated in a specific configuration that enables it to execute said functionalities. The interstices within the structure that are not occupied by the background material (i.e., SiO2) may be filled with a secondary material, such as TiO2.

Continuing with the optical system (100A) of FIG. 1A, and in order to demonstrate the performance of the disclosed methods and devices, an optical system that can classify incident light based on the fundamental properties of propagation direction, wavelength, and polarization over a 3×3 grid of imaging sensors was simulated and analyzed by the inventors. This amount of multi-functionality at both high efficiency and compactness has not been obtained to this degree in the past.

For the purpose of demonstration, the exemplary optical system, similar to what was is shown in FIG. 1A, was designed for three functionalities: polarization splitting of two linearly polarized states, wavelength splitting of two distinct wavelengths, and a basic form of imaging in which five planewave components are focused to five different locations. This totals to nine states that are desired to be classified, and in practice the 3D can be placed above a 3×3 grid of pixels such as CMOS or CCD arrays. Although the 3D structure is designed for a discrete set of states, it can be used to interpolate states on a continuum by analyzing the ratio of intensities among all the pixels.

Figure 1B:
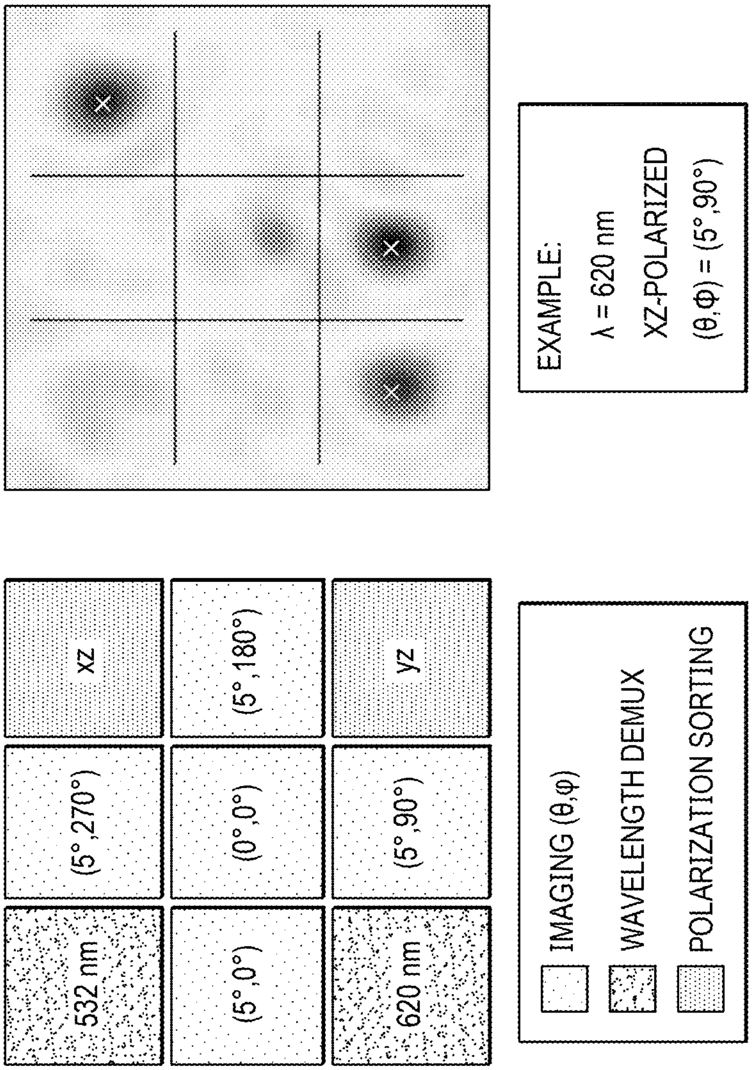
FIG. 1B shows exemplary fields at the focal plane according to an embodiment of the present disclosure.

The polarization and wavelength splitting functionalities are designed to work for all of the assumed incident angles, which include a normally incident case and non-normal incidences that are 5 degrees tilted from normal (polar angle 0=5) with azimuthal angles $\phi \in \{0°, 90°, 180°, 270°\}$. The two design wavelengths are 532 nm and 620 nm. The two polarizations are linear and orthogonal, with one polarized in the xz-plane and the other in the yz-plane. The device is a 3 μm×3 μm×4 μm stack of 20 layers. Each 200 nm layer is comprised of titanium dioxide ($TiO_2$, n=2.4) and silicon dioxide ($SiO_2$, n=1.5), with a minimum feature size of 50 nm. The background material is assumed to be $SiO_2$. FIG. 1B shows examples of the fields at the focal plane under a 620 nm xz-polarized planewave excitation angled at (θ, ϕ)=(5°, 90°). Since this 5 polar angle is in $SiO_2$ with n=1.5, these planewave components couple to 7.5° planewave components in air. On the left side of FIG. 1B, light focusing to different pixels depending on the state of the input light is shown. The right-hand side of the same figure shows the output of 620 nm, xz-polarized planewave input incident at an angle (θ, ϕ)=(5°, 90°).

Continuing with the same exemplary design as described above, the design of the 3D structure was initially optimized in a narrow wavelength range around 532 nm and 620 nm. However, it was observed that the behaviors of functionalities are preserved and predictable when excited at states in between the states the device was optimized for. For example, as the input wavelength is continuously shifted from 532 nm to 620 nm, the ratio of the 620 nm pixel transmission to the 532 nm pixel transmission monotonically increases, while the imaging and polarization functions remain efficient. This occurs, again as mentioned above, despite the device only being optimized in a narrow wavelength range around 532 nm and 620 nm. Similar behavior was observed in the imaging functionality when excited at input angles that were not explicitly optimized within a 5° cone. The read-out from these pixels can thus be used to infer the state of the light incident on the device so long as the input is assumed to be a monochromatic planewave. We find that this behavior does not depend on the chosen mapping of functionality to specific pixels in the focal plane by analyzing the behavior of devices optimized for 20 unique pixel distributions.

The performance of the exemplary embodiment described above can be quantified in two ways. First, the performance of the device under the excitation beams that were assumed when optimizing the device can be checked. This is referred to as training modes. Second, the device at different input angles, wavelengths, and polarization states may be studied to analyze its ability to classify states. This is referred to as validation modes.

Figure 2:
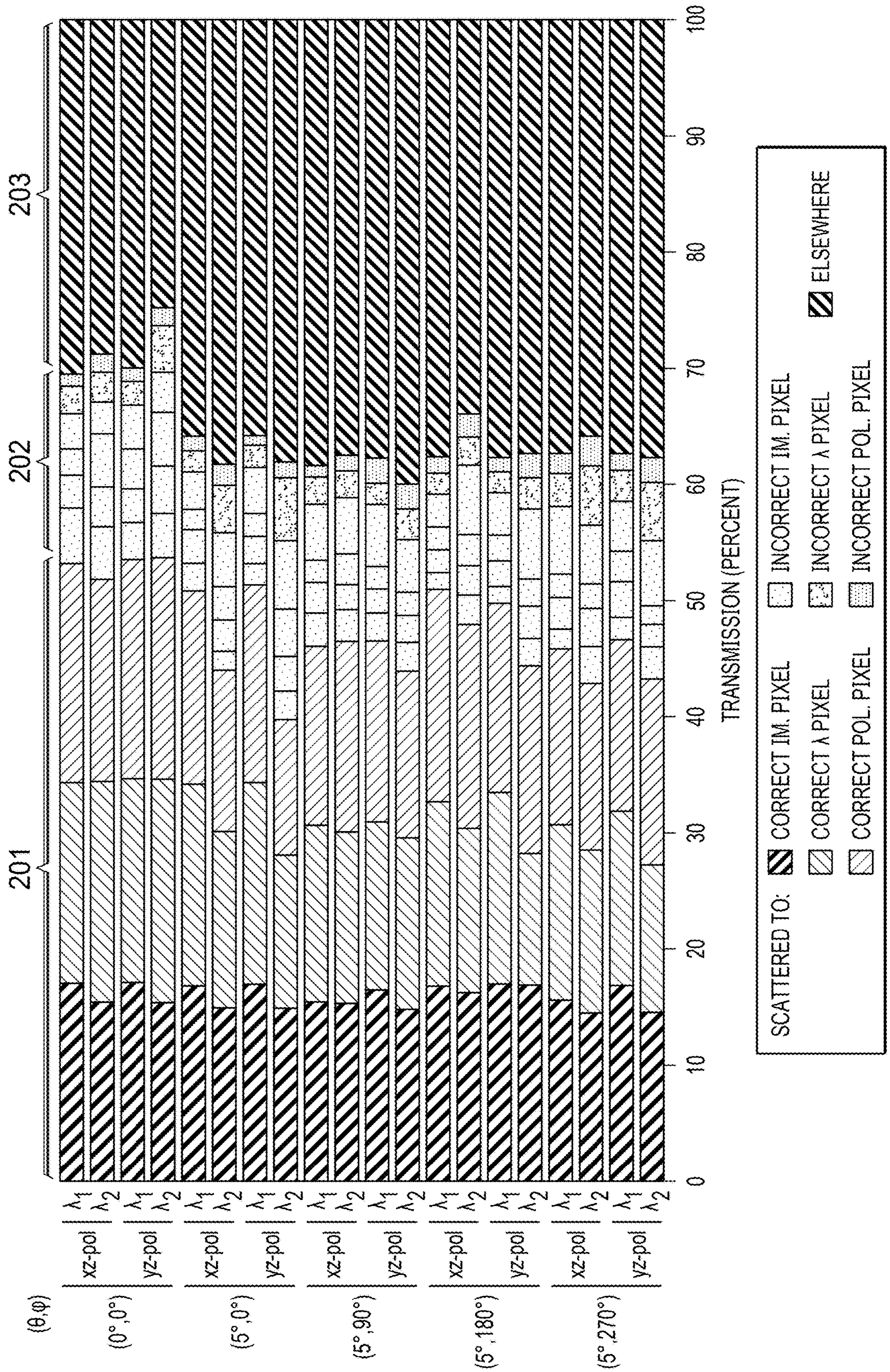
FIG. 2 shows exemplary transmissions to each pixel for each input state for the embodiment of FIG. 1A.

According to the teachings of the present disclosure, the disclosed methods may be implemented to co-optimize 20 different training modes featuring unique combinations of wavelength, polarization, and angle of incidence. The transmission to each pixel for each input state is shown in FIG. 2. The input angle, polarization state, and wavelength are represented by the y-axis. The x-axis represents the fraction of power scattered to different regions. For each state the transmission to the three correct pixels (201), the transmission to the six incorrect pixels (202), and the transmission elsewhere (203), i.e. oblique scattering, back-scattering, etc.) is shown. On average, the transmission to the correct pixels totals 47.7%, the transmission to incorrect pixels totals 16.8%, and the transmission elsewhere totals 35.5%. The imaging pixels tend to be more susceptible to error in the sense that more power is erroneously transmitted to them than the wavelength- or polarization-sorting pixels on average. A possible reason for this is that the different angled input states have higher correlation than the different spectral and polarization input states due to the small device aperture, giving rise to more cross-talk between imaging pixels. Undesired scattering to incorrect pixels could be explicitly minimized as part of the optimization in future tests. The most straight-forward way to do this would be to incorporate the minimization of transmission to these pixels as figure of merits (FoMs) in the overall optimization.

Figure 3A:
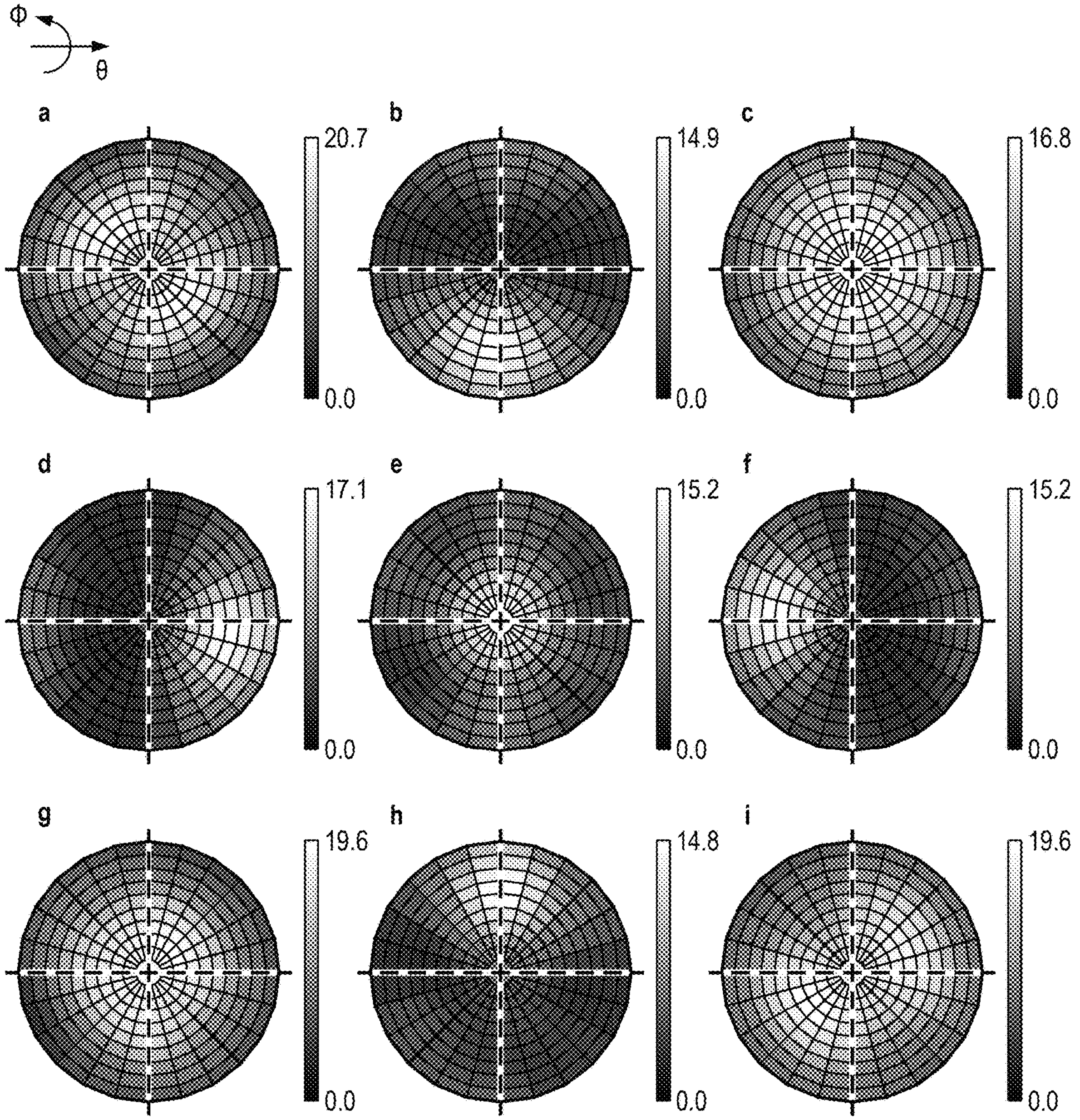
FIGS. 3A-3B demonstrate exemplary performances of the disclosed methods and devices.
Figure 3B:
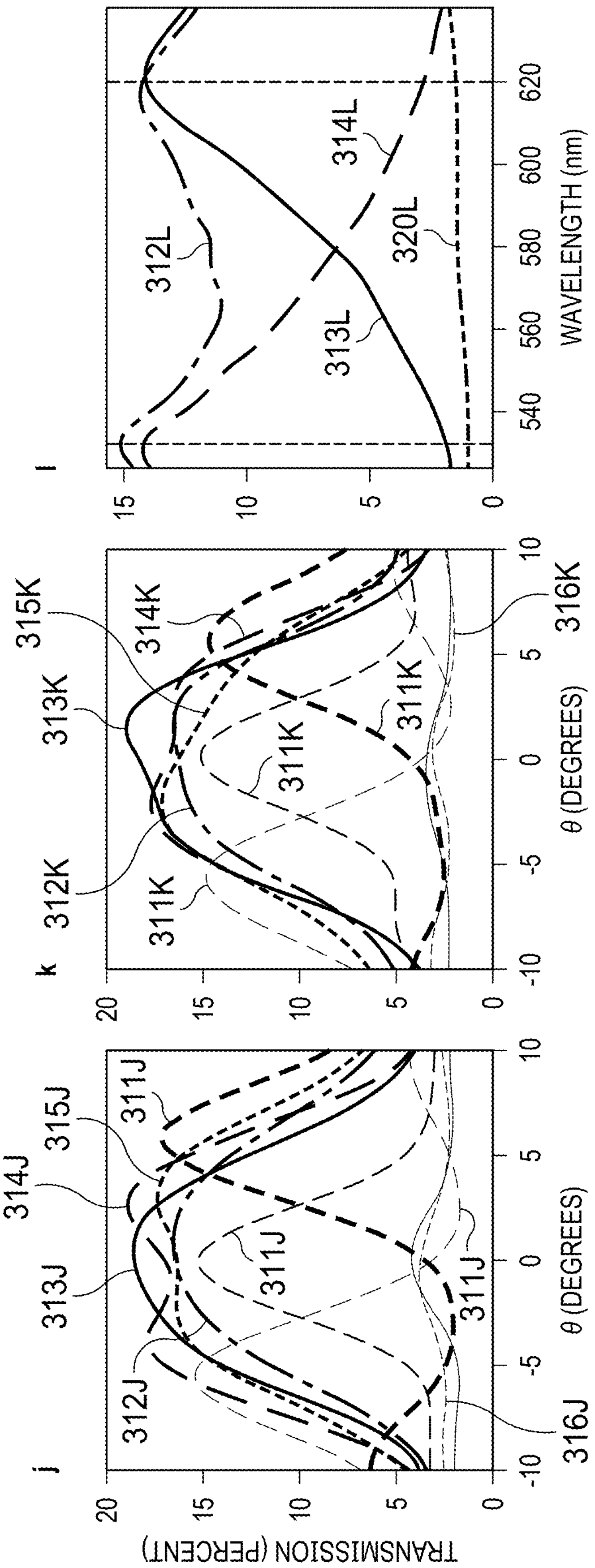

The design process optimizes the performance of the device only for the training modes, and it is unclear what the output of the device will be if the excitation parameters are continuously varied. The performance of the device at input states between that of the designed input states is quantified through by simulating the performance at wavelengths in between 532 nm and 620 nm, at a large set of angles within a 10° input angle cone, and at various polarization states. FIGS. 3A-3B demonstrate the performance of the disclosed methods. FIG. 3A, panels (a-i) plot the transmission to the different pixels in the focal plane for θ from 0° to 10° and ϕ from 0° to 360°. The top-down left-right ordering of these plots is matched to the ordering of the pixels depicted in FIG. 1B. The wavelength demultiplexing plots of FIG. 3A panels (a, g) are averaged in polarization. The polarization sorting plots shown in FIG. 3A panels (c, i) are averaged in wavelength. The imaging plots of FIG. 3A panels (b, d-f, h) are averaged in both polarization and wavelength. FIG. 3B. panels (j-k) represents horizontal and vertical traces of the surface plots of FIG. 3A panels (a-i) along the dashed lines, respectively. FIG. 3B panels (j-k) show various curves representing transmission to different pixels: curves (314J, 314K) correspond to the 532 nm pixel, curves (313J, 313K) correspond to the 620 nm pixel, curves (312J, 312K) correspond to the the xz-polarization pixel, curves (315J, 315K) correspond to the yz-polarization pixel, curves (311J, 311K) represent the on-axis imaging pixels, and curves (316J, 316K) are the off-axis imaging pixels. With reference to FIG. 3B panel (1), curves (314L, 313L) represent the transmission to the 532 and 620 nm pixels, respectively. Curve (312L) is the transmission to the correct polarization pixel given the polarization of the input source, and curve (320L) is the transmission to the incorrect polarization pixel. In FIG. 3B panel (1), all traces are averaged over all evaluated input angles within a 5° cone Referring to FIG. 3B panels (j, k) in order obtain the presented plots, the transmission values are averaged across wavelength, polarization, or both depending on the functionality. For the wavelength sorting functionality, the values are averaged across polarization; for the polarization sorting functionality the values are averaged across wavelength; and for the imaging functionality the values are averaged across both wavelength and polarization. The wavelength and polarization demultiplexing functionalities show a more uniform response across (θ, ϕ) values than the imaging functionality, which means these functions are not highly dependent on incident angle. The imaging functionality is, by design, sensitive to the incident angle. The variation in azimuth for the polarization and spectral pixels is expected because the device is not symmetric, which is required since the desired output fields are not symmetric. However, these deviations are non-ideal, as deviations from a uniform angular response can cause uncertainties in angle classification to cascade to uncertainties in spectral and polarization properties.

Curves (313L, 314L) of FIG. 3B show that as the wavelength shifts from 532 nm to 620 nm, the transmission through the 532 nm pixel smoothly decreases, and the transmission through the 620 nm pixel smoothly increases. These transmission values are averaged over both polarization and across all simulated incident angles ϕ∈[0, 360°] and θ∈[0, 5°]. As expected, the transmission to the 532 nm pixel is maximized for 532 nm wavelengths, and likewise for the 620 nm pixel. The traces smoothly vary between these two wavelengths, indicating that the power is predictably redistributed between the pixels in these cases. As stated previously, curve (312L) represents the average transmission to the correct polarization pixel (for example, xz-polarized input being focused to the xz-polarization pixel), and curve (320L) represents the average transmission to the incorrect polarization pixel (for example, xz-polarized input being focused to the yz-polarization pixel). These transmission values are averaged over wavelength and are averaged over incident angle in the same way curves (312J, 312K, 314J, 314K) are. While there is a drop in efficiency at the non-optimized wavelengths, there remains a high contrast between the curves (312L, 320L) at all wavelengths.

Continuing with FIG. 3B, the imaging functionality transmission values vary smoothly with respect to incident angles (θ, ϕ), but this occurs in a less intuitive way than it would with a lens. Rather than the focus spot continuously shifting across the focal plane as (θ, ϕ) varies, the focused spots instead brighten or dim while remaining approximately centered in the individual pixels. As an example, when (θ, ϕ)=(2.5°, 45°) the light is primarily scattered to the center of the (0°, 0°), (5°, 0°), (5°, 90°) pixels, as well as the relevant wavelength and polarization pixels. In this specific case 532 nm light is not focused to the 620 nm pixel which is the pixel that the incident planewave is oriented towards, and as such is where light would be focused if the device were replaced with a lens. Instead, the wavelength sorting and polarization sorting functionalities are mostly preserved under all excitation angles within an acceptance cone.

The effect of altering the polarization state is predictable since the polarization state of any input excitation can be described by two orthogonal linearly polarized states with a relative amplitude and phase shift between the orthogonal components. As an example, a simple experiment involving a linearly polarized source input into a Wollaston prism would show that as the source is rotated, the output of the Wollaston prism fluidly shifts from one linearly polarized output beam to the other. This behavior is observed in the exemplary design discussed above in the polarizing functionality, where the ratio between the polarizer pixels transmission can be used to infer the relative power of the two orthogonal linear polarization states. However, it would be desirable that the device performance for the wavelength and imaging functionalities is not adversely affected by the polarization states that were not explicitly optimized for. The efficiency of these functionalities may be altered as the cross-polarized output of one beam interferes with the parallel-polarized output of the orthogonally polarized input beam. The amount of cross-polarization is defined by integrating the ratio $|E_x|^2/E_y|^2$ under yz-polarized illumination over the output plane for all incident angles. The highest amount of cross-polarization is-11.9 dB at 620 nm and −13.6 dB at 532 nm. To verify that the various functionalities are not strongly affected, the results of all functionalities at all possible input polarization states were analyzed by sweeping the relative amplitude and phase of the orthogonal input components, and it was observed that interference effects can alter the transmission to the various pixels by a few percent. According to the teachings of the present disclosure, if a particular design seeks to further minimize cross-polarization, then cross-polarization can be explicitly minimized during the optimization. Doing so will consume some design degrees of freedom, which may detract from the efficiency of the various functionalities, but the optimization will not require more time since the number of electromagnetic simulations per iteration will be unchanged.

Based on the previously detailed results, the embodiments such as the one shown in FIG. 1A could be used to analyze the state of incident light at wavelengths between 532 nm and 620 nm and inputs with incident angles within an approximately 5° cone. Additionally, the relative amplitude of the xz-polarized and yz-polarized component can be classified. The classification is done by measuring the ratio of intensity between pixels and using a look-up table to then approximate the state of light. In the case of classifying wavelength and imaging angle, the behavior of smoothly transitioning between states is non-trivial and is not exhibited in typical optical devices such as gratings and lenses. These components tend to spatially shift a beam in the focal plane as the wavelength is varied (grating) or the incident angle is varied (lens), whereas our device only alters the ratio of transmission to the various pixels with very little spatial shift of the beams. In the case of classifying polarization this behavior tends to occur naturally in other optical devices such as birefringent prisms because any polarization state can be decomposed into a coherent sum of two orthogonally polarized states.

While classifying the wavelength and input angle states without ambiguity is not significantly affected by the incident polarization state it does require that the incident light be a monochromatic planewave. The planewave assumption is a common assumption employed in Shack-Hartman sensors and plenoptic sensors, and the assumption of monochromaticity can be satisfied with color filters, or if the light fundamentally comes from a narrow-band source such as a laser. Thus, there are numerous applications in which the disclosed methods and devices can be useful. As an example, the 3D structures designed based on the disclosed teachings can be tiled across a sensor array to enhance the functionality of an image sensor. Such an array could be used to accurately classify the properties of a laser beam, including all fundamental properties of wavelength, polarization, and incident angle within the device's acceptance cone. The angle-dependent nature of the device is similar in principle to angle-sensitive CMOS pixels, and could be used for light field imaging since the incident wavefront angle can be computationally determined using the relative intensity of the imaging pixels. If coupled with a device such as a tunable bandpass filter, then a wavelength-dependent light field image can be obtained, with the added functionality of measuring the relative intensity of the two orthogonal linear polarization components for basic polarimetry. The disclosed methods and devices open up new degrees of freedom in computational imaging applications.

Referring back to the embodiment of FIG. 1A, according to embodiments of the present disclosure, the qualitative behavior of the device does not depend on the specific assignment of functionalities to pixels. This is further clarified in what follows.

There could be a large number of pixel permutations. Twenty different pixel distributions were considered and analyzed. Pixel distributions were chosen randomly, but were chosen to be sufficiently different from the original device by satisfying two criteria: 1) all pixels had to be moved from their original location, 2) no pixel could be rotated by 90, 180, or 270 degrees, thus ensuring that devices were not similar by any rotational symmetry. Each device was optimized until the device was more than 15% binary according to the following equation, where B is the binarization, N is the total number of permittivity points in the design region, Eris the permittivity at the Ah point, and Emin and Emax are the smallest and largest values of permittivity allowed in the design $$B = \frac{1}{N}\sum_i \left| \frac{\epsilon_i - \epsilon_{mid}}{\epsilon_{max} - \epsilon_{mid}} \right|, \; i \in \mathcal{D} \tag{1}$$

$$\epsilon_{mid} = \frac{\epsilon_{min} + \epsilon_{max}}{2} \tag{2}$$

The angular response of each functionality to one another using the overlap integral in Eq. 3 below, integrated over all simulated (θ, Ø) points. This equation quantifies the similarity in the angular transmission profile, evaluating to zero if the responses are completely dissimilar and one if the responses are the same. It is equivalent to a cross correlation with zero lag normalized such that the max possible value is 1.

$$\eta(T_1, T_2) = \left[ \frac{\left| \int\int T_1 T_2 d\theta d\phi \right|^2}{\int\int |T_1|^2 d\theta d\phi \int\int |T_2|^2 d\theta d\phi} \right]^{1/2} \tag{3}$$

Figure 4:
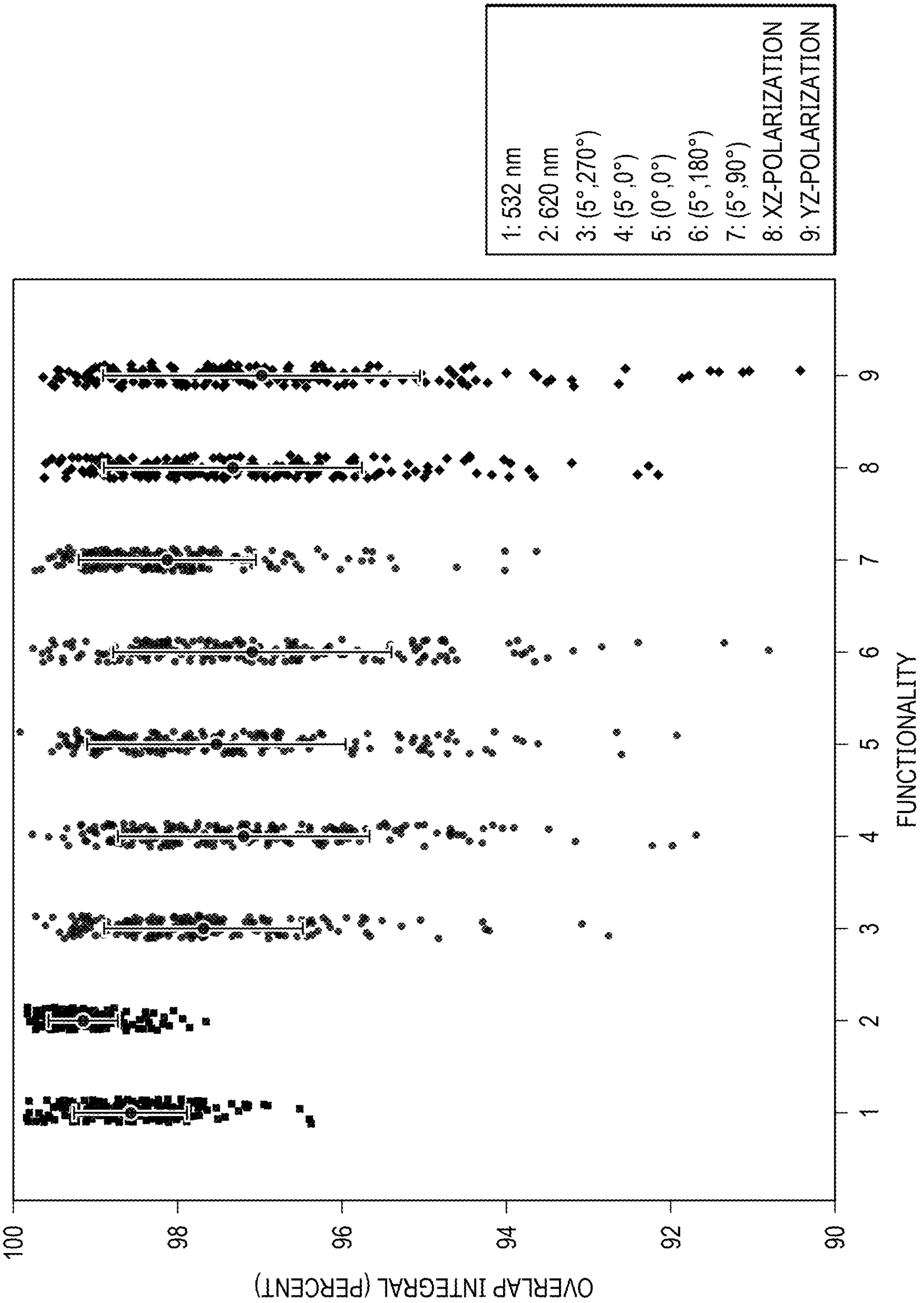
FIG. 4 demonstrates the dependence of device performance on pixel distribution.

For each functionality, the overlap integral for all combinations of devices was evaluated. Each result is plotted as a scatter point shown in FIG. 4, where the x-axis represents the nine different functionalities, and the y-axis represents the computed overlap integral. As can be noticed from the scattered plots, the average overlap integral is greater than 96.9% for all functionalities, suggesting that the arbitrary choice of mapping functionalities to specific pixels has little effect on the behavior of the device.

With further reference to FIG. 1A, the 3D structure may be designed using topology optimization, aided by adjoint-based inverse design. The multi-objective optimization may implement techniques to approach a nearly binary solution during the continuous permittivity design phase. A level-set approach may be used for imposed fabrication constraints. Through various simulations, the inventors found that the designed 3D structures function at many more input conditions than those that were explicitly optimized for. This is an important feature of the disclosed method because it eases the computational burden of optimizing many different merit functions.

Figure 5:
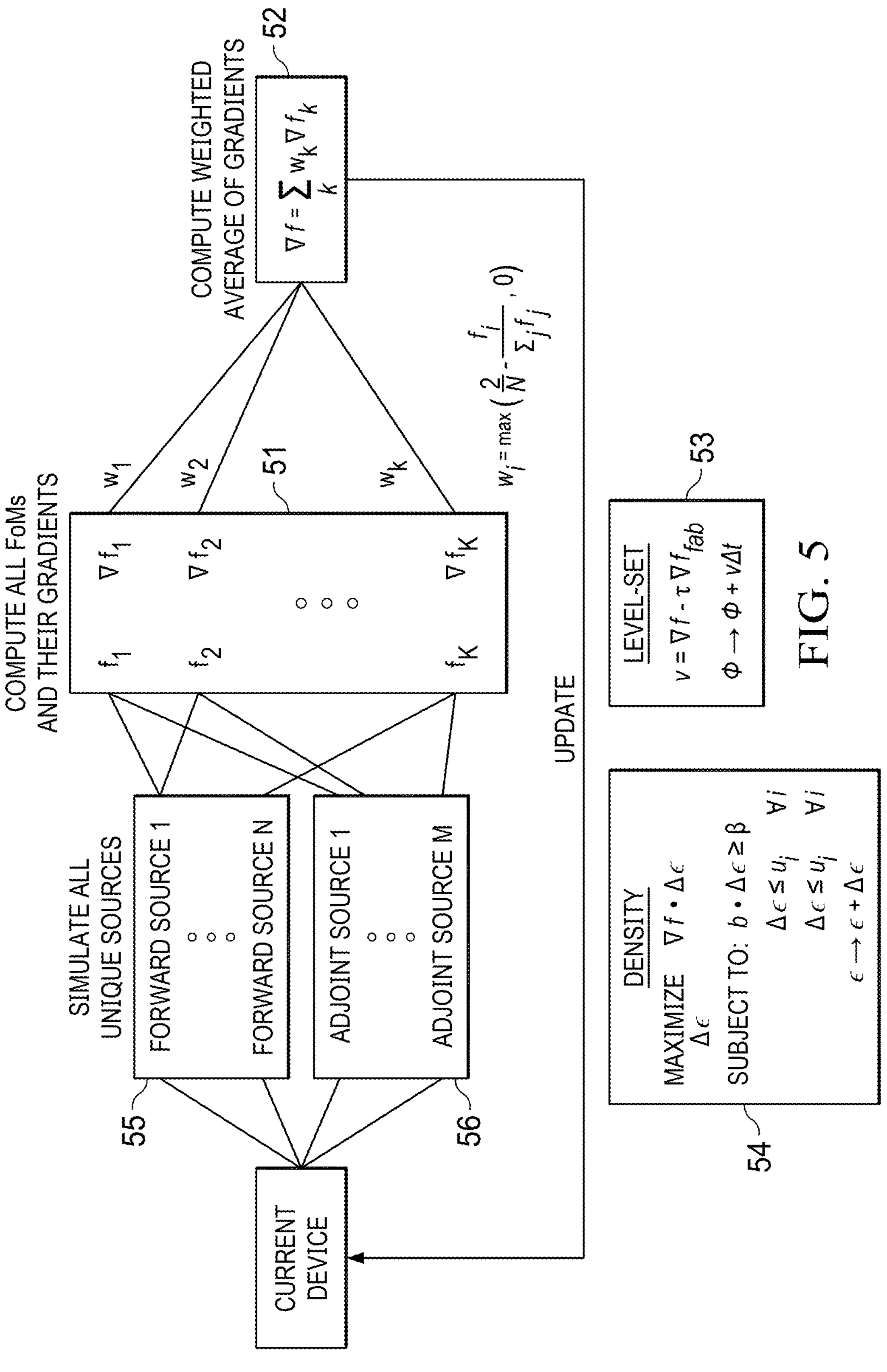
FIG. 5 shows an exemplary block diagram representing an exemplary optimization method according to the teachings of the present disclosure.

The goal of photonic topology optimization is to find a refractive index distribution that maximizes an electromagnetic figure-of-merit (FoM). According to the teachings of the present disclosure, for highly multi-functional structure, the associated optimization is multi-objective. Each objective is a mapping of an input to a FoM: the input is a planewave with a specific angle, polarization, and wavelength; the FoM is the power transmission through the desired pixel. The general procedure for this optimization is shown in FIG. 5. It consists of three main steps: first, the FoMs and their associated gradients are computed, step (51); second, the gradients are combined with a weighted average, step (52); third, the device is updated in accordance with the averaged gradient using either a density-based optimization, step (53), of a continuous permittivity or a level-set optimization, step (54), of a discrete permittivity.

The individual FoM gradients are evaluated at every point in the design region using the adjoint method, which entails combining the electric fields in the design region for a "forward", step (55), and an "adjoint" simulation, step (56) to compute the desired gradient. In this case, the forward case simulates the device under the assumed planewave excitation, and the adjoint case simulates a dipole (with a particular phase and amplitude based on the forward simulation) placed at the center of the desired pixel. This choice of sources optimizes the device to focus light to the location of the dipole. However, we record the performance of the device as power transmission through the desired pixel rather than intensity at a point, since power transmission better represents the signal a sensor pixel would record.

The optimization is performed in two phases: a density-based phase, and a level-set phase. Each phase has a unique update procedure. In the density-based optimization the permittivity of the device is modelled as a grid of grayscale permittivity values between the permittivity of the two material boundaries. This permittivity representation is effectively fictitious (unless an effective index material can be reliably fabricated), and the goal is to converge to a binary device that performs well and is comprised of only two materials.

While the density-based optimization can converge to a fully binary solution, it is faster to terminate the optimization early and force each device voxel to its nearest material boundary. This thresholding step reduces the device performance, which we recover by further optimizing the device with a level-set optimization. Level-set optimization models the device boundaries as the zero-level contour of a level-set function ($\Phi(x, y)=0$), and thus benefits from describing inherently binary structures. Empirically the final device performance is dependent on initial seed, hence the need for the improved density-based optimization that converges to a near-binary solution. Here we use level-set techniques to simultaneously optimize device performance and ensure the final device obeys fabrication constraints.

With reference to step (53) of FIG. 5, the term level-set optimization stems from treating the device boundaries as the zero-level contour of a level-set function $\phi(x, y)$. The level-set function (LSF) is perturbed in accordance with the gradient, which has the effect of perturbing the zero-level contour of the LSF and the associated device boundaries to increase performance. A signed-distance function to define the level-set function (LSF), where the value of $\phi(x,y)$ is proportional to the signed distance from the device boundary. The gradients of the electromagnetic FoM and a fabrication penalty function are combined and used to perturb the LSF, which has the effect of perturbing the boundary of the device such that the electromagnetic FoM is increased and the fabrication penalty term is decreased. The fabrication penalty term includes both a minimum radius of curvature constraint and a minimum gap size constraint of 60 nm. The LSF is then recomputed to ensure it remains a signed-distance function. This process is repeated until the FoM has converged (recovering the performance lost from the binarization step), and the fabrication penalty term is minimized.

According to the teachings of the present disclosure, fabrication restrictions during the level-set optimization are preserved. To that end, a multi-dimensional fabrication penalty function is first analytically computed over the entire device region. In an embodiment, this function includes two types of fabrication constraints: one limits the radius of curvature of the device boundaries, and the other limits the smallest gap size of the device. The terms are integrated over the entire design region, yielding a real number (the fabrication penalty term) that we wish to minimize. The gradient of this fabrication penalty term is computed over the device region using a finite-difference approximation and is subsequently combined with the gradient of the electromagnetic FoM that is computed through the adjoint method, as indicated by step (56) of FIG. 5. The level-set function is perturbed in the direction of this combined gradient, resulting in a shifting of the material boundaries that co-optimizes the electromagnetic FoM and the fabrication penalty term.

Figure 6:
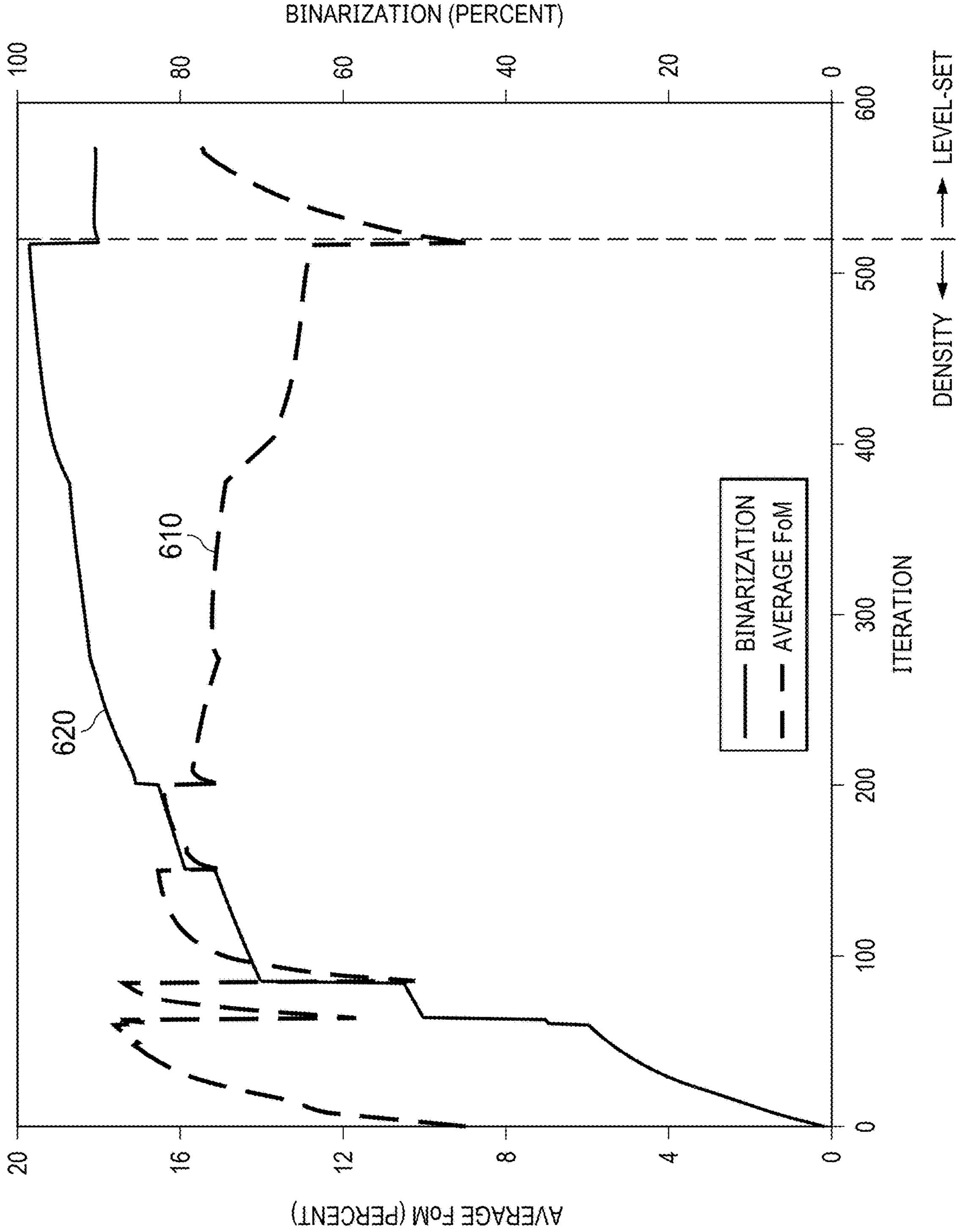
FIG. 6 shows exemplary convergence plots in accordance with embodiments of the present disclosure.

FIG. 6 shows exemplary convergence plots in accordance with embodiments of the present disclosure. Curves (610, 620) represent the average device FoM and device binarization, respectively. The FoM being plotted is the power transmission through the appropriate pixel. In some embodiments this is different from the FoM that is used to define the adjoint source, which is the intensity at the center of the appropriate pixel.

The density-based optimization is considered converged when the binarization, which is defined by Eq. 1 is nearly 100%. At various points, the binarization is forced to increase by passing the permittivity through a sigmoidal function and changing the device permittivity to the output of this function. The FoM is then allowed to recover before repeating this discrete push in binarization. At some iteration, e.g. iteration 512 in the case shown in FIG. 6, the optimization switches to a level-set optimization, which recovers some of the performance that was lost during the final phases of the density optimization. During the level-set optimization, the binarization is recorded as approximately 90% because the boundaries of the device are smoothed out yielding a continuous permittivity value. This can intuitively be thought of as the level-set function passing through a simulation mesh voxel, which is modelled in the FDTD simulation as a dielectric volume average of the two materials. Therefore, the density optimization is overly restrictive at binarization values above 90%, since it does not allow for this type of border smoothing, instead modelling the device as a discretized grid of binary voxels. This explains why the level-set function is able to recover substantially more performance than what is lost at the initial conversion from density-based optimization to a level-set optimization, recovering to approximately the same average FoM value as the density-based optimization when it was 90% binary.

With further reference to FIG. 6, during the convergence process, the FoM may be permitted to decrease during the density-phase of the optimization. In other words, a hard constraint is imposed that forces binarization to increase, thus forcing the device to tend towards a binary device while either maximizing or minimally sacrificing the FoM using the gradient information from the adjoint-retrieval process.

Figure 7:
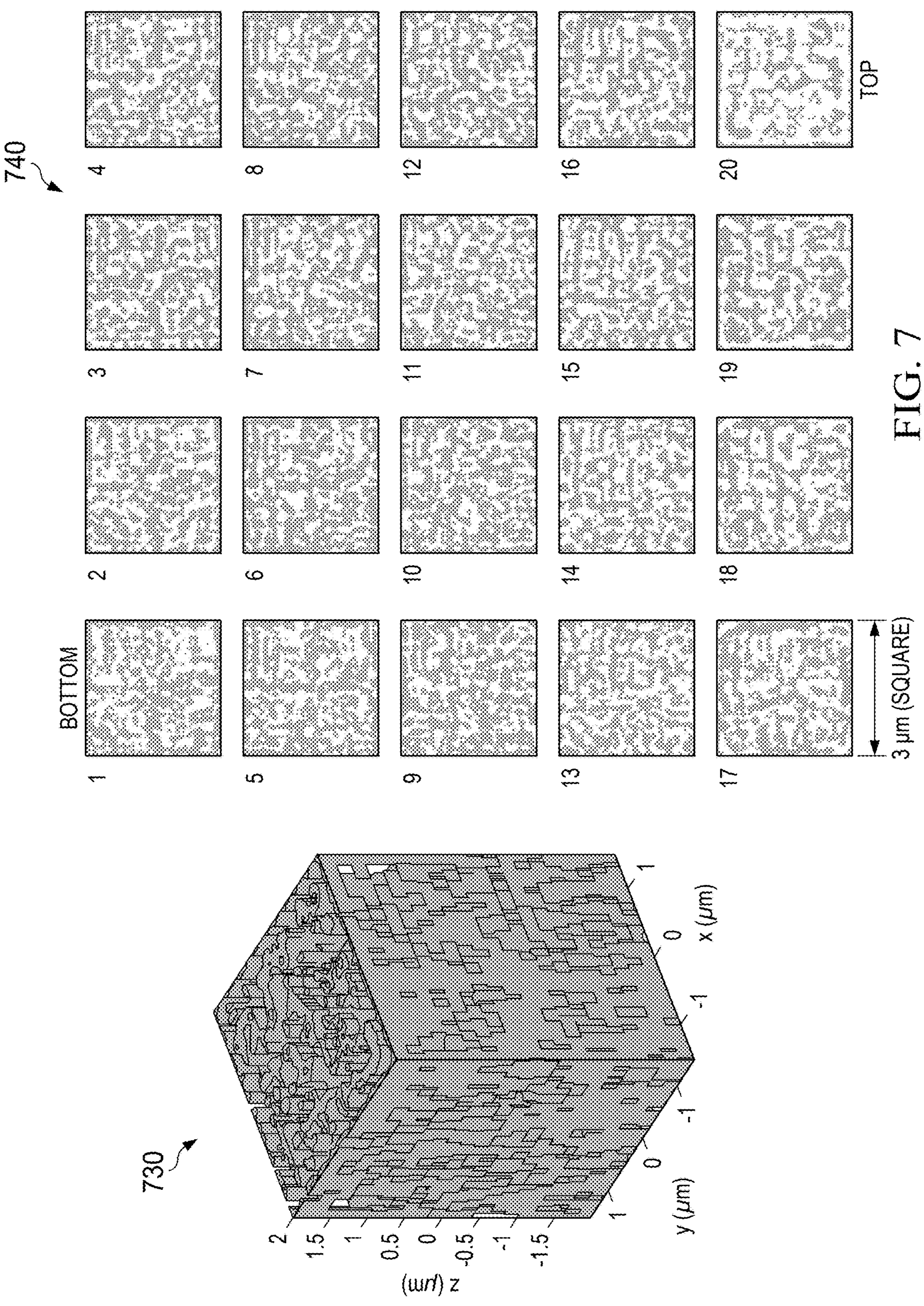
FIG. 7 shows an exemplary three-dimensional structure designed based on layers according to an embodiment of the present disclosure.

FIG. 7 shows an exemplary 3D structure (730) according to an embodiment of the present disclosure. Such structure is built based on, for example, a 20-layer design. Constituent layers (740) are also shown. In an embodiment, the shaded region includes $TiO_2$, and the white area includes $SiO_2$. Layer 1 is the bottom layer nearest to a sensor array that may be disposed underneath 3D structure (730). In another embodiment, each layer (740) may measure 3×3 μm.

In what follows, a breakdown/summary of the optimization algorithm in accordance with the teachings of the present disclosure is provided:

1. Initial Density-Based Optimization:
   - The device is initially modeled as a grid of continuous permittivity values between the two material boundaries (e.g., TiO2 and SiO2).
   - Multiple figures of merit (FoM) functions are defined, corresponding to different desired optical functionalities (e.g., wavelength sorting, polarization sorting, and angle-dependent focusing).
   - The optimization uses the adjoint method to efficiently compute gradients of the FoMs with respect to the permittivity distribution.
   - A multi-objective optimization is performed, combining the gradients of different FoMs using a weighted average.
   - The permittivity distribution is updated iteratively based on the combined gradient.
2. Binarization Process:
   - Throughout the density-based optimization, the algorithm periodically pushes the design towards a more binary state.
   - This is performed by passing the current permittivity distribution through a sigmoidal function.

After each binarization step, the optimization continues to allow the FoM to recover. During this recovery, binarization is forbidden from decreasing using the methods described in FIG. 5 (54).

3. Transition to Level-Set Optimization:
   - Once the density-based optimization reaches a near-binary state (e.g., around 90% binary), the optimization switches to a level-set approach.
   - The device structure is now represented by a level-set function (LSF), where the device boundaries are defined by the zero-level contour of the LSF.
4. Level-Set Optimization:
   - The LSF is initialized based on the final state of the density-based optimization.
   - The optimization now updates the LSF, which in turn modifies the device boundaries.
   - This phase incorporates both electromagnetic performance and fabrication constraints.
   - Two types of fabrication constraints are included:
     - Minimum radius of curvature for device boundaries
     - Minimum gap size between features (e.g. 60 nm)
   - A fabrication penalty term is computed analytically over the entire design region.
   - The gradient of this penalty term is combined with the electromagnetic FoM gradient.
   - The LSF is perturbed based on this combined gradient, optimizing both performance and manufacturability.
5. Iterative Refinement:
   - The level-set optimization continues iteratively until the FoM converges and the fabrication penalty term is minimized.
   - After each update, the LSF is recomputed to ensure it remains a signed-distance function.

This disclosed methods and devices provide the following benefits:

1) The simultaneous sorting of wavelength, polarization, and incident angle is an advancement of existing art which is essentially based on sorting only wavelengths and polarization. This enhancement allows for predictable control of all fundamental properties of light within a single component.

2) The device performance was found to behave well for inputs whose parameters lie between the states the device was trained on. This well-behaved interpolating behavior was true for wavelength, polarization, and incident angle. This has not been disclosed in prior art and the results suggest a promising avenue towards increasing generalizability and computation feasibility of inverse-design.

3) The importance of mapping specific functions to specific pixels in the focal plane was studied and showed a remarkable insensitivity to this mapping. Previous work in this field involved only four pixels per volumetric device, so very few permutations were available. The present work involves nine pixels and studied 20 non-symmetric permutations.

The scale of the disclosed optimization method is also substantially larger than prior works. In addition to the increased number of outputs/pixels, the increased functional complexity required a thicker device to realize reasonable efficiencies. This adds to the total number of optimized points within the design volume. At this larger scale, it was empirically found that standard methods of incorporating fabrication constraints failed. Most notably the binarization constraint that restricts the ultimate design to only two materials failed, which is typically enforced through the application of a sigmoidal function to the device gradients. However, this is a "soft constraint" that operates by scaling gradients and does not strictly enforce binarization at finite sigmoid strengths. To address this, a method that incorporates a "hard constraint" on binarization is provided. The method identifies the direction of steepest ascent that simultaneously increases binarization by a certain user-set, non-zero amount. This iterative update strategy enforces the design ultimately converges to a binary design.

The invention claimed is:

1. A device for multi-dimensional wavefront sensing, comprising:
- a three-dimensional (3D) structure configured to receive incident light; and
- a single planar sensor array disposed underneath the 3D structure, the single planar sensor array comprising multiple pixels;
- wherein the 3D structure is configured to simultaneously focus different combinations of wavelength, polarization, and propagation direction of the incident light onto different corresponding pixels or combinations of pixels of the single planar sensor array.

2. The device of claim 1, wherein the 3D structure is configured to maintain wavelength and polarization demultiplexing functionalities across a range of incident angles within an acceptance cone.

3. The device of claim 2, wherein the 3D structure comprises a stack of multiple layers.

4. The device of claim 3, wherein each layer of the stack comprises a first material with a first refractive index and a second material with a second refractive index being different from the first refractive index.

5. The device of claim 4, wherein the first material comprises silicon dioxide (SiO2) and the second material comprises titanium dioxide (TiO2).

6. The device of claim 1, wherein the 3D structure has dimensions of 3 μm×3 μm×4 μm.

7. The device of claim 1, wherein the single planar sensor array comprises a 3×3 array of pixels.

8. The device of claim 1, wherein the 3D structure is configured to perform wavelength demultiplexing, polarization sorting, and angle-dependent focusing.

9. The device of claim 8, wherein the wavelength demultiplexing is configured to separate at least two distinct wavelengths.

10. The device of claim 8, wherein the polarization sorting is configured to separate at least two polarization states, including orthogonal linear states.

11. The device of claim 8, wherein the angle-dependent focusing is configured to focus at least five different incident angles to five different locations on the single planar sensor array.

12. An optical system for multi-dimensional wavefront sensing, comprising:
- an array of devices, each device comprising: a three-dimensional (3D) structure configured to receive incident light; and
- a single planar sensor array disposed underneath the 3D structure, the single planar sensor array comprising multiple pixels;
- wherein each 3D structure is configured to simultaneously focus different combinations of wavelength, polarization, and propagation direction of the incident light onto different pixels or combinations of pixels of a corresponding portion of the single planar sensor array.

13. The optical system of claim 12, wherein each 3D structure in the array is identical.

14. The optical system of claim 12, wherein at least some of the 3D structures in the array have different configurations.

15. The optical system of claim 12, wherein the system is configured to perform light field imaging.

16. The optical system of claim 15, further comprising a tunable bandpass filter coupled to the array of devices to enable wavelength-dependent light field imaging.

17. The optical system of claim 12, configured to perform laser beam profiling, the laser beam profiling including classification of wavelength, polarization, and incident angle of the laser beam.

18. The system of claim 12, wherein each 3D structure is optimized using topology optimization based on adjoint-based inverse design.

19. A device for multi-dimensional wavefront sensing, comprising:

a three-dimensional (3D) structure configured to receive incident light, wherein the 3D structure comprises a volumetric stack of multiple layers, each layer of the stack having a subwavelength permittivity distribution; and a sensor array disposed underneath the 3D structure, the sensor array comprising multiple pixels;

wherein the subwavelength permittivity distribution within the 3D structure is configured to simultaneously focus different combinations of wavelength, polarization, and propagation direction of the incident light onto different corresponding pixels or combinations of pixels of the sensor array.

* * * * *